(12) United States Patent
Chang et al.

(10) Patent No.: US 7,145,713 B2
(45) Date of Patent: Dec. 5, 2006

(54) TECHNIQUES FOR RECOVERING OPTICAL SPECTRAL FEATURES USING A CHIRPED OPTICAL FIELD

(75) Inventors: Tiejun Chang, Bozeman, MT (US); Mingzhen Tian, Bozeman, MT (US); William R. Babbitt, Bozeman, MT (US); Kristian Merkel, Bozeman, MT (US)

(73) Assignee: Montana State University, Bozeman, MT (US)

( * ) Notice: Subject to any disclaimer, the term of this patent is extended or adjusted under 35 U.S.C. 154(b) by 24 days.

(21) Appl. No.: 11/179,765

(22) Filed: Jul. 12, 2005

(65) Prior Publication Data

US 2006/0012797 A1    Jan. 19, 2006

Related U.S. Application Data

(60) Provisional application No. 60/587,331, filed on Jul. 13, 2004.

(51) Int. Cl.
*G02F 2/00* (2006.01)

(52) U.S. Cl. ........................... 359/325; 359/326
(58) Field of Classification Search ......... 359/325–326
See application file for complete search history.

(56) References Cited

U.S. PATENT DOCUMENTS 5,928,146 A * 7/1999 Itagaki et al. ............... 600/410

OTHER PUBLICATIONS

Alwi, H et al., Chirp response of a single-plate transducer, Journal of Acoustical Society of America, Dec. 1, 1996, pp. 3655-3664, vol. 100, No. 6, Publisher: Acoustical Society of America.

Anokhov, S et al., Rapid spectroscopy using lasers with swept lasing frequency, Optical Spectroscopy, Jan. 1, 1974, pp. 106-108, vol. 36, No. 1, Publisher: The Optical Society of America.

Duppen, K et al., Chirped four-wave mixing, Physical Review A, Jun. 1, 1993, pp. 5120-5137, vol. 47, No. 6, Publisher: The American Physical Society.

Greiner, R et al., A Digital Approach to Time-Delay Spectrometry, Journal of Audio Engineering Society, Jul. 1, 1989, pp. 593-602, vol. 37, No. 7/8, Publisher: Audio Engineering Society.

He, Y et al., Optical heterodyne signal generation and detection in cavity ringdown spectroscopy based on a rapidly swept cavity, Chemical Physics Letters, Feb. 23, 2001, pp. 215-220, vol. 335, No. 3-4, Publisher: Elsevier Science B.V.

(Continued)

*Primary Examiner*—John D. Lee
(74) *Attorney, Agent, or Firm*—Evans & Molinelli PLLC; Eugene Molinelli

(57) ABSTRACT

Techniques for recovering optical spectral features include receiving a detected time series that represents a temporally varying intensity of an optical signal. The optical signal is formed in response to an interaction between a target optical spectrum and a chirped optical field. The chirped optical field is an optical field that has a monochromatic frequency that varies in time. The target optical spectrum is an optical frequency dependent optical property of a material or device. A phase correction factor is determined based only on one or more properties of the chirped optical field. The detected time series is corrected based on the phase correction factor to produce an output time series that reproduces in time a shape of the target spectrum in frequency. These techniques allow for fast measurement of spectral features and eliminate the need for prior knowledge of the target optical spectrum to adjust the chirp rate.

21 Claims, 15 Drawing Sheets

OTHER PUBLICATIONS

He, Y et al., Rapid measurement of cavity ringdown absorption spectra with a swept-frequency laser, Applied Physics B: Lasers and Optics, Nov. 10, 2004, pp. 941-945, vol. 79, Publisher: Springer-Verlag.

Hok, G , Response of Linear Resonant Systems to Excitation of a Frequency Varying Linearly with Time, Journal of Applied Physics, Mar. 1948, pp. 242-250, vol. 19, Publisher: American Institute of Physics.

Jefferson, C et al., Frequency-domain measurements of spectral hole patterns burned with phase-coherent pulses, Chemical Physics Letters, Jan. 24, 1992, pp. 60-66, vol. 189, No. 1, Publisher: Elsevier Science Publishers B.V.

Lavielle, V et al., Wideband radio frequency spectrum analyzer: improved design and experimental results, Journal of Luminescence, Mar. 1, 2004, pp. 75-89, vol. 107, Publisher: Elsevier B.V.

Lawrence, M et al., Dynamic response of a Fabry-Perot interferometer, Optical Society of America B, Apr. 1, 1999, pp. 523-532, vol. 16, No. 4, Publisher: Optical Society of America.

Marshall, Alan, Theory of Fourier transform ion cyclotron resonance mass spectroscopy: Response to frequency-sweep excitation, Journal of Chemical Physics, Aug. 15, 1980, pp. 1581-1590, vol. 73, No. 4, Publisher: American Institute of Physics.

Meixner, A et al., Measurement of the Stark effect with subhomogeneous linewidth resolution in Eu3+ : YAlO3 with the use of photon-echo mod, Physical Review B, Sep. 1, 1992, pp. 5912-5916, vol. 46, No. 10, Publisher: The American Physical Society.

Melinger, J et al., Generation of Narrowband Inversion with Broadband Laser Pulses, Physical Review Letters, Mar. 30, 1992, pp. 2000-2003, vol. 68, No. 13, Publisher: The American Physical Society.

Menager, L et al., Time-domain Fresnel-to-Fraunhofer diffraction with photon echoes, Optics Letters, Jul. 15, 1999, pp. 927-929, vol. 24, No. 14, Publisher: Optical Society of America.

Menager, L; et al., Fresnel diffraction on the edge of causality, Optics Letters, Sep. 15, 2000, pp. 1316-1318, vol. 25, No. 18, Publisher: Optical Society of America.

Menager, L et al., Demonstration of a radio-frequency spectrum analyzer based on spectral hole burning, Optics Letters, Aug. 15, 2001, pp. 1245-1247, vol. 26, No. 16, Publisher: Optical Society of America.

Poletti, M, Linearly Swept Frequency Measurements, Time-Delay Spectrometry, and the Wigner Distribution, Journal of Audio Engineering Society, Jun. 1, 1988, pp. 457-468, vol. 36, No. 6, Publisher: Audio Engineering Society.

Poletti, M , The application of linearly swept frequency measurements, Journal of Acoustical Society of Ameria, Aug. 1, 1988, pp. 599-610, vol. 84, No. 2, Publisher: Acoustical Society of America.

Saleh, B et al., selected pages, Fundamentals of Photonics, Aug. 1, 1991, pp. 18, 169, 179, 181, Publisher: John Wiley and Sons, Inc, Published in: Hoboken, NJ.

Vanderkooy, J, Another Approach to Time-Delay Spectrometry, Journal of Audio Engineering Society, Jul. 1, 1986, pp. 523-538, vol. 34, No. 7/8, Publisher: Audio Engineering Society.

\* cited by examiner

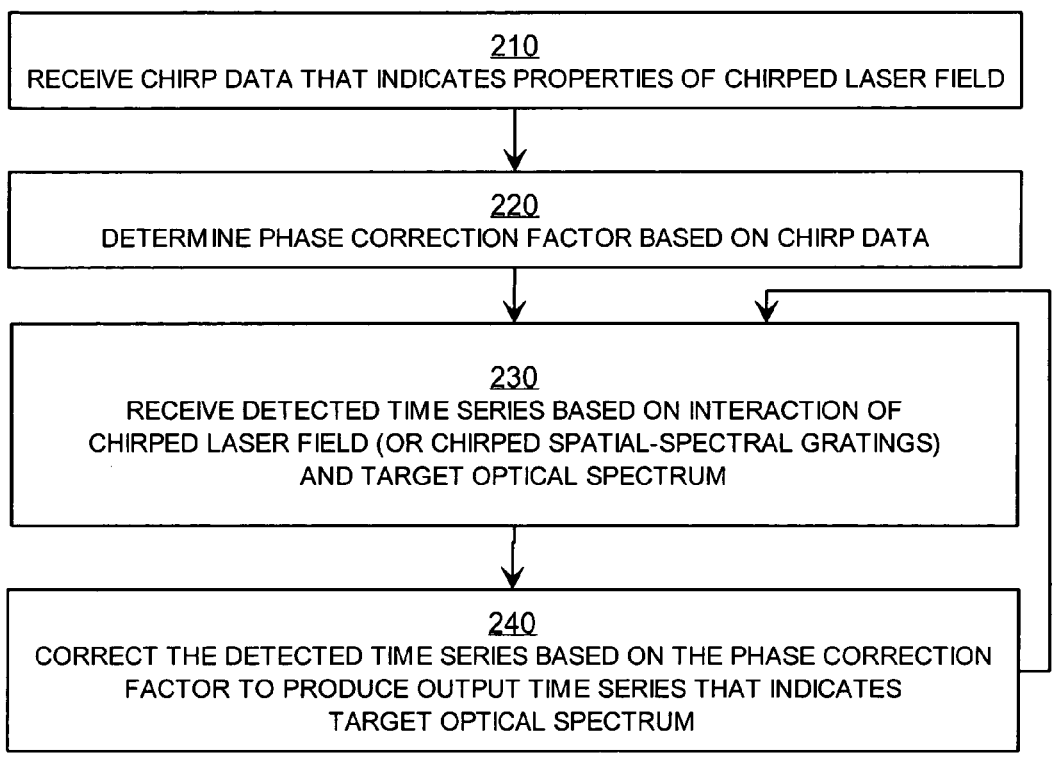

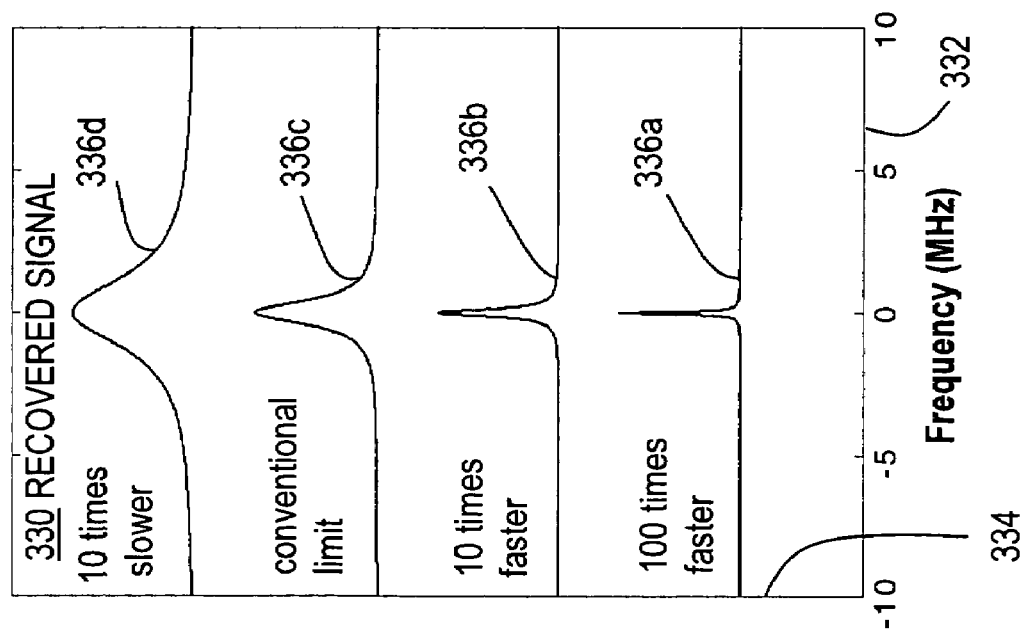

TIME (3.2 nanosecond/point)

TIME (3.2 nanosecond/point)

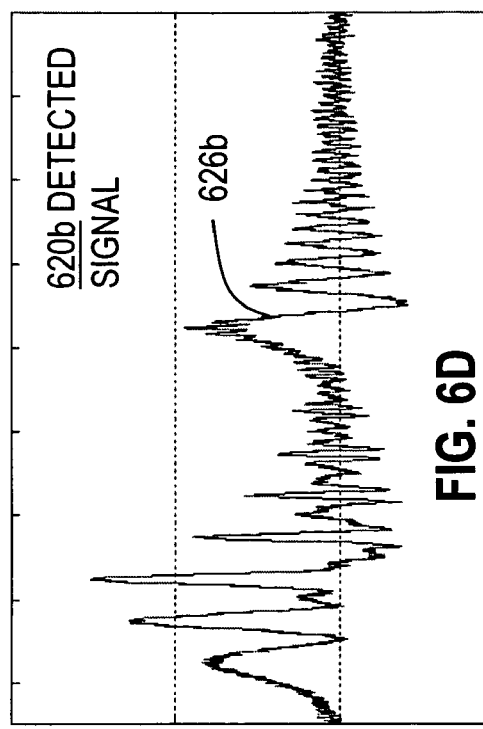
FIG. 6A
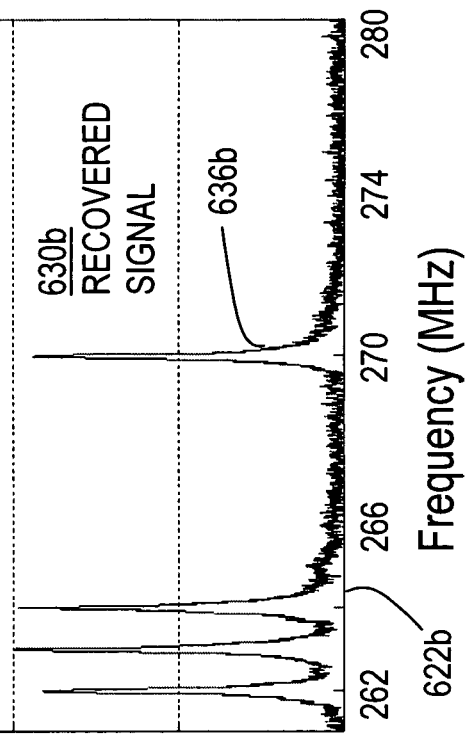
FIG. 6C
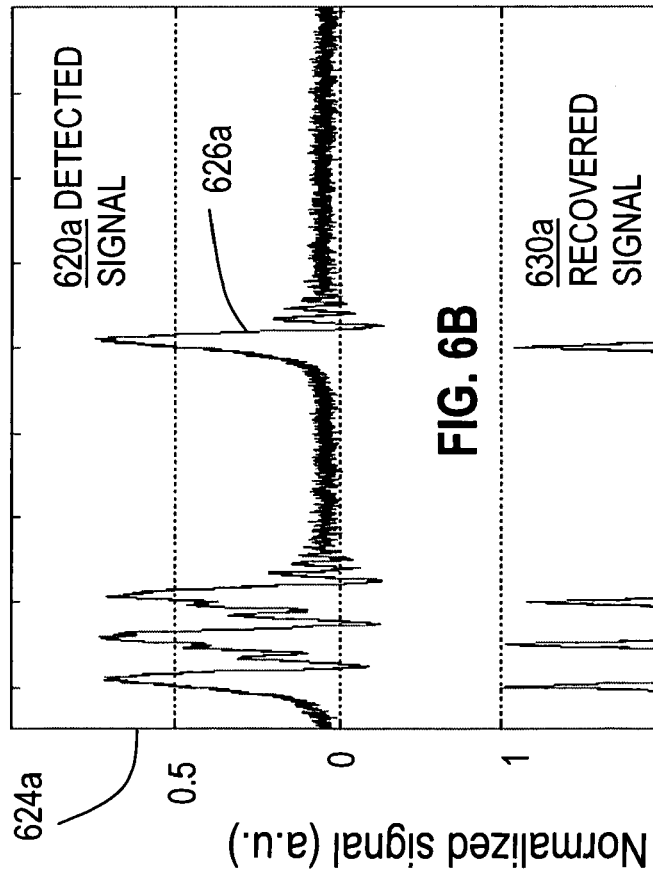
FIG. 6B
FIG. 6D

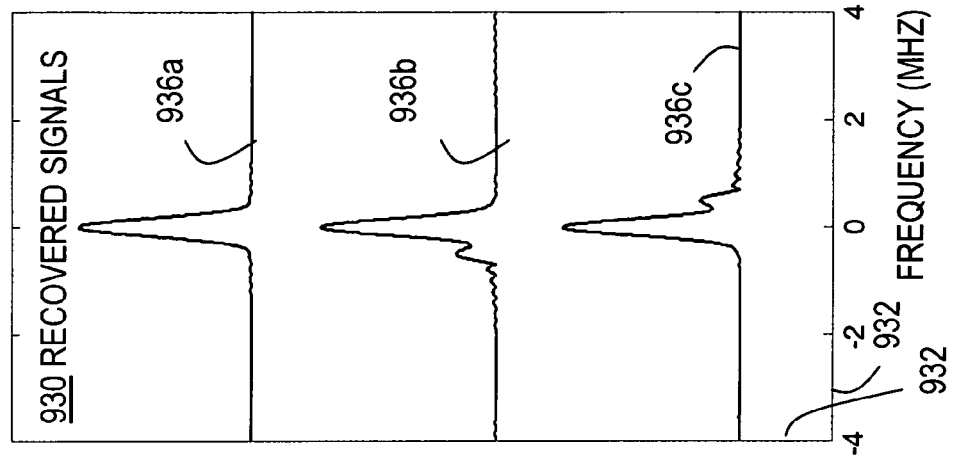
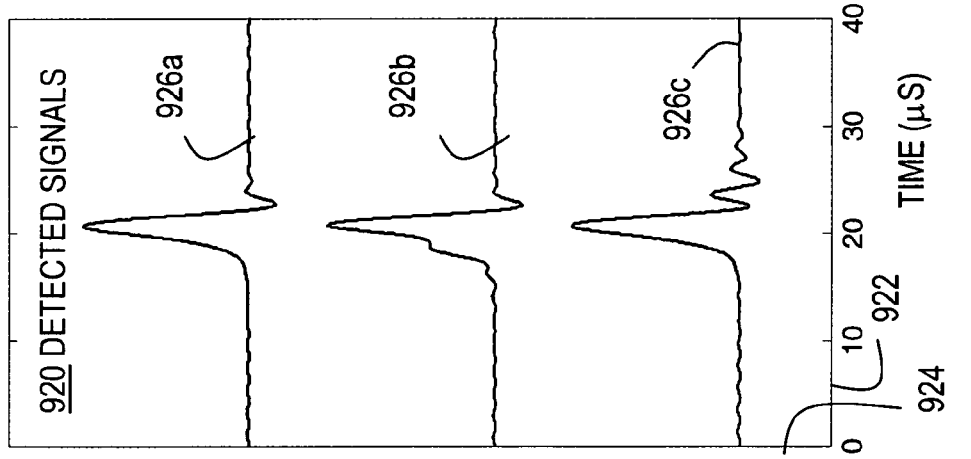
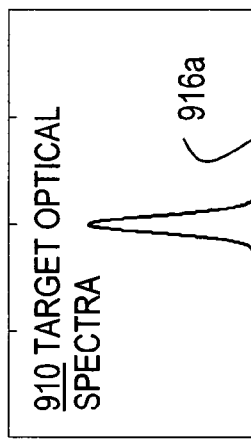

TECHNIQUES FOR RECOVERING OPTICAL SPECTRAL FEATURES USING A CHIRPED OPTICAL FIELD

CROSS-REFERENCE TO RELATED APPLICATIONS

This application claims benefit of Provisional Appln. 60/587,331, filed Jul. 13, 2004, the entire contents of which are hereby incorporated by reference as if fully set forth herein, under 35 U.S.C. §119(e).

STATEMENT OF GOVERNMENTAL INTEREST

This invention was made with Government support under Contract No. MDA-972-03-1-0002 awarded by the Defense Advanced Research Projects Agency and Montana Board of Research and Commercialization Technology (Grant #03-08). The Government has certain rights in the invention.

BACKGROUND OF THE INVENTION

1. Field of the Invention

The present invention relates to optical signal processing to determine features of a target optical spectrum, and, in particular, to the use of a chirped optical field to recover the target optical spectrum. Here a target optical spectrum is a spectrum at optical frequencies that is output by a device, included inherently in a material or device, or recorded by artificial action in a material or device, or formed in some combination.

2. Description of the Related Art

Information processing based on optical analog signal processing promises to provide advantages in speed, size and power over current information processing systems. Many versatile optical coherent transient (OCT) processing devices have been proposed. An OCT device relies on broadband complex spatial-spectral grating formed in the optical properties of a material, such as an inhomogeneously broadened transition (IBT) material, also called a spatial-spectral (S2) material. A spatial-spectral grating has the ability to generate a broadband optical output signal that depends on an optical probe waveform impinging on that grating and the one or more interacting optical signals that formed the grating.

In some OCT devices, the approach to accessing the information in the spatial-spectral grating is to probe that grating with a high bandwidth, Fourier-transform-limited optical signal, such as a coherent brief optical pulse, or a series of such coherent brief optical pulses. Under certain conditions, the probing of the grating can produce optical output signals that are generally referred to as stimulated photon echoes or optical coherent transients. A single brief coherent light pulse with a bandwidth equal to that of the spectral grating stimulates a time-delayed output signal whose temporal profile represents the Fourier transform of the spectrum recorded in the grating structure.

While useful in many applications, the approach of readout with a high bandwidth, Fourier-transform-limited coherent brief optical pulse or series of optical pulses at the full bandwidth of processing can suffer, at present, from the limited performance in dynamic range of photo-detectors and analog to digital converters (ADCs, also called digitizers) that are needed to make a measurement of any instantaneous high bandwidth optical signal. Existing high bandwidth detectors and ADCs have limited performance and higher cost as compared to lower bandwidth detectors and digitizers.

Swept frequency modulated optical signals are called "chirped optical fields" and "chirped laser fields" herein. The frequency sweep can be linear in time with a constant chirp rate (called linear chirp or linear frequency modulation, LFM) or non-linear with a time varying chirp rate. Optical LFM signals have been used as probe waveforms in pulse sequences to write spatial-spectral gratings for applications of storage, signal processing, true time delay generation, and arbitrary waveform generation, and also for readout of spectral gratings. LFM probe waveforms generate a temporal output signal that represents a collective readout of all the absorbers, as with the brief pulse excitation, but under the condition of swept excitation. By properly choosing the rate of frequency change with time, called herein the chirp rate κ, a temporal readout is produced that is slow enough to be digitized by low cost, high performance digitizers in the frequency bands of interest. See for example, published International Patent application WO 2003/098384 entitled "Techniques for processing high time-bandwidth signals using a material with inhomogeneously broadened absorption spectrum, Inventors: K. D. Merkel, Z. Cole, K. M. Rupavatharam, W. R. Babbitt, T. Chang and K. H. Wagner, 27 Nov. 2003 (hereinafter Merkel), the entire contents of which are hereby incorporated by reference as if fully set forth herein.

The concept of using a chirped laser field as a probe signal has been called spectral-to-temporal mapping. Coherent interaction of resonances of the physical system with the chirped laser field is called a stimulated photon echo or optical coherent transient effect. Commonly, this interaction results in a response signal that is a time varying change to the amplitude and/or phase of the probe field. The frequency sweep rate or chirp rate, κ, is defined as the frequency scan range, or bandwidth, B, divided by the duration of the sweep time, τc, as given by Expression 1a $$\kappa = B/\tau_c, \tag{1a}$$

In some cases, the response field phase and amplitude can be directly observed. For some other cases, e.g., at optical frequencies, in order to obtain the full information about both the phase and the amplitude, a heterodyne detection scheme is used, where a reference field interferes with the response signal. Typically the reference field is close in frequency with the response signal so that a lower frequency beat output is produced that is readily observable with photo-detectors and high performance digitizers. Under some conditions, heterodyne detection is automatic, such as when the probe field spatially overlaps the response signal and acts as a reference, as in the case of absorption or dispersion. In other cases, the output signal is distinct from the probe field and a reference field is made to interfere with the response signal before being received by a measurement apparatus, such as a digitizing detector.

It has been observed that the detected signal received by the detectors is not a simple mapping in time of a target optical spectrum with which the probe signal interacts, but often includes spurious features. For example, an attenuated ringing of a single peak spectral feature in a target optical spectrum is observed in the detected signal. The composite ringing of multiple spectral features leads to a complex distortion of the target optical spectrum when mapped into a temporal readout signal.

A commonly used method to reduce the distortion to a negligible level is to limit the chirp rate to a slow sweep rate, usually set by an inequality such as in Expression 1b $$\kappa \ll \Gamma^2 \tag{1b}$$

Where Γ is the width of the finest spectral feature in the system. The use of a slow sweep rate to avoid distortion has been applied in various physical systems, such as acoustic systems, electric circuits, and optical systems.

For example, in optical absorption spectroscopy, the frequency swept excitation is widely used to directly map the absorption spectrum to the time domain; and the frequency chirped field is applied at a slow chirp rate to reduce the distortions, (S. P. Anokhow, V. I. Kravchenko, and M. S. Soskin, "Rapid spectroscopy using lasers with swept lasing frequency", Opt. Spectrosc. 36(1), 10(1972)). Anokhow et. al. pointed out that "From the point of view of laser spectroscopy the most interesting mode of operation is adiabatically slow sweeping" and also that "Under adiabatically slow frequency sweeping the shape of the luminescence line does not have any appreciable effect on the kinetics, and the amplitude of the peaks results from the pumping intensity". Duppen et. al. also observed the problem that using a fast chirp rate results in distortions, or asymmetrical ringing on the response in frequency chirped four wave mixing experiments (K. Duppen, F. de Haan, E. T. J. Nibbering, and D. A. Wiersma, "Chirped four-wave mixing", Phys. Rev. A. 47, 5120(1993)). The sweep rate limit was also pointed out in the response of the frequency chirped excitation of a Fabry-Perot interferometer (M. J. Lawrence, B. Willke, M. E. Husman, E. K. Gusman, E. K. Gustafson, and R. L. Byer, J. Opt. Soc. Am. B, 16(4), 523(1999)). Optical frequency chirped fields have been used for readout of the spectral features in inhomogeneously broadened spectral materials. In the majority of such measurements, to map the spectral features to the temporal domain, the chirp rates were set to be slow with respect to the width of the finest spectral feature (C. M. Jefferson and A. J. Meixner, Chem. Phys. Lett. 189, 60(1992), A. J. Meixner, C. M. Jefferson, and R. M. Macfarlane, Phys. Rev. B 46, 5912(1992), Z. Cole, T. Bottger, R. K. Mohan, R. Reibel, W. R. Babbitt, R. L. Cone, and K. D. Merkel, Appl. Phys. Lett. 81, 3525(2002)). The entire contents of each of these references are hereby incorporated by reference as if fully set forth herein.

While a slow chirp rate can reduce such distortions, the use of a slow chirp rate is not always desirable or applicable. For example, a disadvantage of the slow chirp rate requirement is the need to know or accurately estimate the spectral resolution of the finest significant features in the spectrum of interest. Often the finest spectral resolution is not known. In some applications, the readout time is limited and a fast chirp rate (e.g., $\kappa \geq \Gamma^2$) is required to cover a sufficient bandwidth of interest.

For another example, in some applications of optical spectroscopy techniques, such as cavity ringdown absorption spectroscopy, which is a highly sensitive and accurate way to measure weak gas-phase molecular spectra, a fast chirp is required to enhance the performance. A swept-carrier frequency of the laser is used to observe the detected signal as the heterodyne beating between the transmitted field and the impulse response, and the distortions due to a fast frequency sweep are clearly observed.

In one approach, (Y. He, B. J. Orr, J. Chinese Chem. Soc, 48, 591(2001); Y. He, B. J. Orr, Appl. Phys. B75 267(2002); Y. He, B. J. Orr, Appl. Phys. B79, 941(2004)) subsequent steps were then taken to convert the temporal distortions into an envelope only function using a demodulating logarithmic amplifier, to observe the cavity ringdown time, but not to compensate for the distortions.

Based on the foregoing, there is a clear need for techniques to use a chirped optical field to probe a target optical spectrum, which does not suffer the deficiencies of prior art approaches to optical readout. In particular, there is a need for techniques to read out a target optical spectrum using chirp rates that are not limited by the finest spectral resolution of the target optical spectrum, which is not known in some applications.

SUMMARY OF THE INVENTION

Techniques are provided for recovering optical spectral features in a target optical spectrum using a chirped laser field by determining and applying a frequency dependent correction factor to a detected signal. These techniques allow the determination of the spectral content of a target optical spectrum during one or more optical interactions (including, for example, optical absorption, transmission, reflection, diffraction, dispersion and scattering) of the target optical spectrum with the chirped laser field, without limitations imposed by the spectral or spatial resolution of the target optical spectrum. Here a target optical spectrum is a spectrum at optical frequencies that is output by a device, included inherently in a material or device, or recorded by artificial action in a material or device, or formed in some combination. As used herein, optical fields are understood to include all types of high frequency propagating electromagnetic waves, including, but not limited to, visible light, infrared radiation, ultraviolet light, microwaves, millimeter waves, and terahertz waves. Optical spectra can be any spectra that have frequency dependence that modifies propagating electro-magnetic waves, including, but not limited to, visible light, infrared radiation, ultraviolet light, microwaves, millimeter waves, and terahertz waves.

In a first set of embodiments, a method includes determining a phase correction factor based only on one or more properties of a chirped optical field used to interact with a target optical spectrum. In these embodiments, the target optical spectrum is an optical frequency dependent optical property of a material or device. The chirped optical field is an optical field that has a monochromatic frequency that varies in time. A detected time series is received, which represents a temporally varying intensity of an optical signal. The optical signal is formed in response to an interaction between at least the target optical spectrum and the chirped optical field. The detected time series is corrected based on the phase correction factor to produce an output time series that reproduces in time a shape of the target spectrum in frequency.

In some embodiments of the first set, determining the phase correction factor includes determining a Fourier transform of the chirped optical field.

In some embodiments of the first set, the chirped optical field has well-known values for well-known properties, and the phase correction factor is determined based on the well-known values.

In some of these embodiments, the well-known properties include a constant chirp rate (κ) that indicates a change in frequency of the chirped optical field with time, and a start frequency (vs) that indicates an initial frequency at a start of the chirped optical field.

In some such embodiments, determining the phase correction further includes determining a frequency (v) dependent correction factor on a phase term φc given by the equation $\phi c = \exp[i \pi (2 \text{vs} v - v^2)/\kappa]$, that includes an effect of a quadratic phase, where i is the square root of −1 and π is the well known ratio of a circumference to a diameter of a circle.

In some of these embodiments, correcting the detected time series includes determining a Fourier transform of the detected time series. The Fourier transform of the detected time series is multiplied by the correction factor equal to the reciprocal of the quadratic phase form φc to produce a corrected transform. An inverse Fourier transform of the corrected transform is determined to produce the output time series.

In some alternative embodiments of this set, correcting the detected time series includes determining an inverse Fourier transform of the correction factor equal to the reciprocal of the quadratic phase term φc to produce a transformed correction. The transformed correction is then convolved with the detected time series to produce the output time series.

In a second set of embodiments, a method includes receiving a detected time series that represents a temporally varying intensity of an optical signal. The optical signal is formed in response to an interaction between an incident optical field having a target optical spectrum and a material with a chirped spectral grating. The chirped spectral grating is a spectral grating of grating period that varies with optical frequency. A phase correction factor is determined based only on one or more properties of the chirped spectral grating, such as the chirp rate of a chirped optical field that formed the grating. The detected time series is corrected based on the phase correction factor to produce an output time series that reproduces in time a shape of the target spectrum in frequency.

In other sets of embodiments, a computer readable medium stores instructions used to perform one or more steps of the methods described above.

In various embodiments, these spectrum recovery techniques enable the recovery of arbitrary spectral features with arbitrarily fast readout chirp rates, provided the chirp bandwidth covers the full spectrum of interest plus an additional bandwidth ≈κ/δv, where δv is the finest feature width and κ is the chirp rate. The spectral resolution provided by the spectrum recovery technique is δv=1/τc and is determined by the chirp duration τc instead of the chirp rate κ. Thus Γ is the finest feature in the target optical spectrum and δv is the resolution of the recovery technique related to the chirp duration.

Furthermore, in various embodiments, these spectrum recovery techniques enable a fast measurement of spectral features over a broad spectral range with high resolution and eliminate the need for prior knowledge of the spectral feature to adjust the chirp rate, as required by conventional absorption spectroscopy. In various embodiments, spectral features over a bandwidth B, are measured with chirp rates up to κ=Bδv, which are fast compared to the limit of conventional absorption spectroscopy κ<Γ². In order to resolve spectral features as small as the technique resolution limit, δv, using a chirp with a rate of κ, the detector is selected to have a bandwidth of κδv⁻¹. For the case of maximum chirp rate, κ=Bδv, the detector bandwidth should be B, which is the same bandwidth desired for coherent transient spectroscopy.

Since the chirp readout in many embodiments uses heterodyne detection, where the detected signal is the beat of the response field and a reference field such as the transmitted field, the output signal is stronger than the direct detection of the power of the response signal. Since the recovery algorithm treats conventional absorption spectroscopy and coherent transient spectroscopy under the same physical framework, embodiments are applicable for a vast range of chirp rates and provide flexibility in a variety of applications, including RF signal processing and RF spectral analysis.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a flow diagram that illustrates at a high level a method for recovering a target optical spectrum, according to an embodiment;

FIG. 3C is a graph that shows four corrected output signals for the four target optical spectra shown in FIG. 3A, vertically offset, according to an embodiment;

FIG. 6A is a graph that shows a detected signal for an experimental target optical spectrum with four spectral holes that were previously burned in a material and a chirped laser field with a first chirp rate interacting with the material;

FIG. 6B is a graph that shows the corrected output signal for the detected signal shown in FIG. 6A, according to an embodiment;

FIG. 6C is a graph that shows a detected signal for an experimental target optical spectrum with four spectral holes that were previously burned in a material and a chirped laser field with a second chirp rate interacting with the material;

FIG. 6D is a graph that shows the corrected output signal for the detected signal shown in FIG. 6C, according to an embodiment;

FIG. 9A is a graph that shows spectral peaks of various width in three simulated target optical spectra, vertically offset;

FIG. 9B is a graph that shows three simulated detected signals for the three target optical spectra shown in FIG. 9A, respectively, vertically offset, when the chirped laser field has a bandwidth that does not resolve narrow features;

FIG. 9C is a graph that shows three corrected output signals for the three target optical spectra shown in FIG. 9A, vertically offset, according to an embodiment;

DETAILED DESCRIPTION

Techniques are described for recovering optical spectral features using a chirped laser field. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Several embodiments of the invention are descried below in the context of spectral-spatial gratings formed by optical absorption variations in an IBT material using heterodyne detection. However, the invention is not limited to this context. In other embodiments of the invention, the techniques are applied to impulse responses that modify the amplitude or the phase, or both, of the electric field of the optical probe through various physical processes, including but not limited to absorption, transmission, diffraction, reflection, scattering and dispersion. Thus, in various embodiments, the technique is applied to, among other phenomena, measurement of the spectral features of an absorption or gain spectrum, naturally occurring or induced by one or more optical interactions, optical cavity reflection and transmission, Bragg grating reflections and transmission, spectrally dependent diffraction, dispersion, and diffraction from complex spatial surface gratings and volume gratings. In some embodiments, the techniques are applied to recover target optical spectra without using heterodyne detection, but instead using advanced optical detectors and digitizers yet to be produced.

1. Structural Overview

Figure 1:
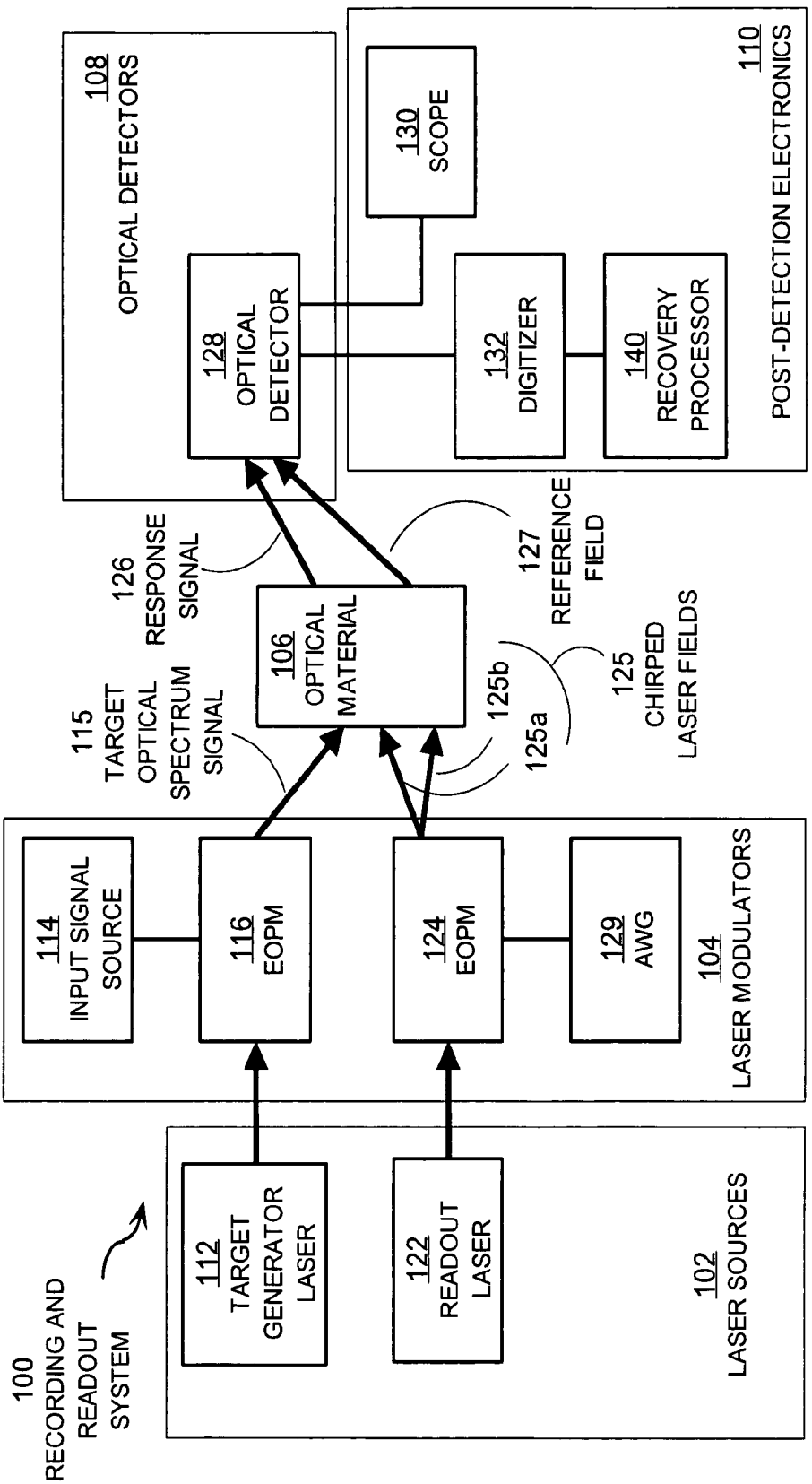
FIG. 1 is a block diagram that illustrates components of an optical system for recording and reading optical signals from an optical material, according to an embodiment.

FIG. 1 is a block diagram that illustrates components of an optical system 100 for recording and reading optical signals from an optical material, according to an embodiment. Although a certain number of components are shown in FIG. 1 for the purposes of illustration, in other embodiments more or fewer components are included in system 100.

Optical recording and readout system 100 includes one or more laser sources 102, laser modulators 104, optical materials 106, optical detectors 108, and post-detection electronics 110 separated by zero or more optical components (not shown) for directing optical beams, such as mirrors, phase plates, optical fibers, among others well known in the art of optics.

In the illustrated embodiment 100, laser sources 102 include an input laser 112 and a readout laser 122. These laser sources provided stabilized optical carrier frequency beams used to carry the target optical spectrum and the chirped laser field used as a probing waveform. In some embodiments, a single laser provides the carrier frequency beam for both the target optical spectrum and probe signals. In some embodiments, additional laser sources are included in laser sources 102.

The laser modulators 104 modulate the carrier frequency beams to produce signal beams with rich frequency content. In the illustrated embodiment, laser modulators 104 include input signal source 114, electro-optic phase modulators (EOPMs) 116, 124 and arbitrary waveform generator (AWG) 129. In some embodiments, one or more EOPMs 116, 124 are replaced with or added to other optical modulators such as one or more acousto-optic modulators (AOMs), electro-optic amplitude modulators, and electro-absorption modulators. In some embodiments, AWG 129 is replaced by other wave generators, such as one or more pulse pattern generators (PPGs).

The input signal source 114 is any combination of components that generate a target optical spectrum to be placed on an optical carrier for use in system 100. For example, input signal source 114 is a radio frequency signal to be analyzed, such as a radar pulse or its reflected return, or both, as described in Merkel. The input signal source is an electronic signal, such as a voltage. EOPMs 116 are used to modulate the optical carrier from input laser 112 in phase in proportion to the sign and magnitude of the applied RF voltage. This produces a phase encoded optical field 115 with a target optical spectrum. In other embodiments, other modulators are used in place of or in addition to EOPMs 116 to produce an optical field 115 encoded in frequency or amplitude or both with the target optical spectrum. In other embodiments, multiple modulated laser beams 115 in one or more directions interact to form the optical target optical spectrum. The single direction of the depicted optical field 115 is called a collinear geometry, which records only the spectral content of the signal. In some embodiments, various angled beam geometries are used, in which the signal 115 consists of multiple beams impinging on the optical material in different directions.

The AWG 129 generates a chirped radio frequency waveform (such as a linear radio-frequency chirp) of bandwidth B around a carrier radio frequency. The EOPM 124 imposes this same chirp bandwidth B on the laser carrier beam from readout laser 122 to produce one or more chirped laser fields 125 starting at an optical frequency (vs). In some embodiment, AWG 129 is replaced by other frequency chirped RF sources, such as pulse PPGs. In some embodiments, EOPM 116 and EOPM 124 are replaced by one or more AOMs. In other embodiments, the readout laser 122 can create an optical chirp, and no external modulator scheme, such as the combination of components 124 and 129, is needed or used.

The optical material 106 records one or more optical field that impinge on the material with sufficient intensity and duration. When multiple beams interact in the optical material 106 at different angles, spatial-spectral structures are formed in the material. When all beams impinge in the same direction only spectral content is recorded. For example, in some embodiments the optical material is an IBT material that stores a complex spatial-spectral grating as absorption variations within a doped, low temperature crystal. In some embodiments, the one or more optical fields 115 produce target optical spectra as spectra or spatial-spectral gratings. In some embodiments, one or more chirped laser fields 125, are recorded as spectra or spatial-spectral gratings in optical material 106. At a later time, another optical beam is directed with relatively lower intensity to the optical material 106 to produce a response signal 126. The chirped laser field 125 and the optical field 115 may impinge on the optical material 106 at the same location and angle or at different locations and angles.

For heterodyne readout processes, a reference optical field 127 is also produced. Any method of generating a reference field may be used. In the illustrated embodiment, the reference optical field 127 emerges from the optical material, usually in a spatial mode that has not recorded the target optical spectrum from optical field 115, such as experienced by chirped laser field 125b. In some embodiments, the reference signal 127 is a chirped laser field (not shown) that has not passed through the optical material 106. In some embodiments, the reference signal 127 is the transmitted probe signal that is naturally in the same direction as the response signal 126 that itself is often delayed. Thus, in such embodiments, the signal detected at the optical detectors 108 is naturally heterodyne. In some embodiments, the reference signal 127 is a response signal from the chirped optical field interacting with one or more spatial-spectral gratings recorded in the optical material 106 for the purpose of generating a reference field.

In some embodiments, the optical material 106 is a material or device (such as an etalon) with an inherent target optical spectrum that is not the result of artificial recording. In such embodiments, components 112, 114, 116 and resulting optical fields 115 are omitted.

The optical detectors 108 include one or more detectors such as optical detector 128 that detect the time-varying optical intensity in a certain optical bandwidth. In some embodiments, a one or two dimensional array of optical detectors like detector 128 are used to simultaneously detect a response signal 126 on multiple spatial modes. Scanned or instant images can be generated by the array of detectors. In some embodiments, the optical detector 128 detects only the response signal. In some embodiments, the optical detector 128 detects the heterodyne combination of the response signal 126 and reference signal 127. For example, the heterodyne combination generates beat frequency variations that are much lower in frequency and larger in amplitude than response signal 126 intensity variations; therefore the beat frequency variations are more accurately measured with current detectors. In some embodiments using chirped laser fields 125 with a chirp rate $\kappa$ that exceeds the inequality given by Expression 2 above, the signal detected by detector 128 is distorted.

The post-detection electronics 110 use electrical signals output by detectors 108, such as optical detector 128. In the illustrated embodiment, post-detection electronics 110 include scope 130, digitizer 132 and recovery processor 140. The scope 130 displays the output from one or more optical detectors 128. For example, in some embodiments, the scope 130 is an oscilloscope that displays analog or digital data. In some embodiments, the scope 130 is omitted. The digitizer 132 converts analog output from optical detector 128 to a discrete time series of digital values. In some embodiments, optical detectors 108 produce digital output and digitizer 132 is omitted. The recovery processor 140 determines and applies a correction factor for correcting the distorted signal detected by detector 128, as described in more detail below. In various embodiments, recovery processor 140 includes different hardware and software components that perform the methods described in the next section.

2. Functional Overview

It has been observed that the distortion in the detected signal is similar to the response of a linear resonant system to frequency swept excitation in an electrical circuit, as analyzed by Gunnar Hok, "Response of Linear Resonant System to Excitation of a Frequency Varying Linearly with Time," Journal of Applied Physics, 19, pp 242–250, 1947, (hereinafter Hok) the entire contents of which are hereby incorporated by reference as if fully set forth herein. In Hok, a temporally extended ringing originated from a quadratic phase of the frequency sweep. The ringing increased with the frequency sweep rate of the probe field. This ringing is deterministic and can be predicted by theory based on properties of the frequency swept excitation field.

Solutions for removing the distortion have been proposed for two different types of physical systems that do not use heterodyne or optical detection: 1) Fourier transform ion cyclotron resonance mass spectroscopy; and 2) time-delay spectrometry. In these non-heterodyne cases, the impulse response amplitude and phase of the fields were measured directly, because the frequencies were in operationally advantageous ranges for detectors and digitizers in use. The detected fields were electrical fields in Fourier transform ion cyclotron resonance mass spectroscopy, and were acoustic and electrical waves for time-delay spectrometry. For the Fourier transform ion cyclotron resonance mass spectroscopy, a frequency swept electric field oscillating at radio frequency is used to detect the ion cyclotron resonance so that the ion mass to charge ratio can be extracted from the resonance frequency. The distortions due to the frequency sweep are corrected by deconvolving the response with the frequency-swept excitation, as described in Alan G. Marshall and D. Christopher Roe, "Theory of Fourier transform ion cyclotron resonance mass spectroscopy: Response to frequency-sweep excitation", J. Chem. Phys. 73(4), 1581, 1980, the entire contents of which are hereby incorporated by reference as if fully set forth herein. Time-delay spectrometry is used to measure the frequency response functions of acoustic system and electric circuits where the distortion on the impulse response due to the fast frequency sweep is observed. The linear swept measurement is the time-delay spectrometry was analyzed using Wigner Distribution and a solution was developed to remove the distortion, as described in Mark A. Poletti, "Linearly swept Frequency measurements, Time-Delay Spectrometry, and Wigner Distribution", J. Audio Eng. Soc., 36(6), 457, 1988, the entire contents of which are hereby incorporated by reference as if fully set forth herein. A slightly different algorithm was proposed to solve the same kind of problem in Richard Greiner, Jamsheed Wania, and Gerardo Noejovich, "A Digital Approach to Time-Delay Spectrometry", J. Audio Eng. Soc., 37(7/8) 593, 1989, the entire contents of which are hereby incorporated by reference as if fully set forth herein. These solutions have not included the case of optical frequency chirped fields, or a case where the distorted fields could not be measured directly, nor has the application of the solution been discussed in reference to optical resonances such as those in spatial spectral holographic materials with inhomogeneously broadened transitions.

In the illustrated embodiment, the theoretically predicted quadratic phase of a linear chirped laser field is used to determine the ringing response in heterodyne detections and to remove that ringing response from the detected signals. In other embodiments, the predicted correction factors of a more general chirped optical field are determined and used to remove distortion from the detected signals, whether heterodyne detection is used or not. For purposes of illustration, the theory for a linear chirped laser field is described here to show how a frequency dependent correction factor is determined and applied to a detected signal. However, the invention is not limited by this theory or discussion.

2.1 Theoretical Overview

For readout of the spectral features in IBT materials, the readout field is actually generated by diffraction of the probe field by spectral features, as analyzed by T. Chang, R. K. Mohan, M. Tian, T. Harris, W. R. Babbitt, and K. D. Merkel, "Frequency-chirped readout of spatial-spectral absorption features", Phys. Rev. A, 70, 063803, 2004 (hereinafter, Chang I), the entire contents of which are hereby incorporated by reference as if fully set forth herein. Chang I observed that in a collinear geometry, the heterodyne detection comes from the beating of the impulse response field with the transmitted field, and distortions are seen in the case of fast chirp rate ($\kappa$ not $<<\Gamma^{-2}$). In some cases of spatial-spectral absorption features, the option of using an angled beam geometry was also pointed out, where a heterodyne detection of the input response field can be made by interaction with an external reference field.

In general, optical devices that produce an impulse response have spectral features that modify the amplitude and phase of spectral components of a probing optical field. The following discussion concentrates on absorption target spectra and their recovery, but the recovery algorithm is applicable to all materials and devices with spectral features. An electric field can be represented as, $$E^{in}(t)=E^{in}_c(t)e^{i2\pi v_0 t}+c.c. \tag{2a}$$

where $E_c^{in}(t)$ is a complex envelope. When this electric field is incident onto a medium with arbitrary absorption spectral features, there results, in the non-saturated regime, an output field that has spectral components described as, $$E^{out}(v)=E^{in}(v)-iL\mu_0\pi v_0 cP(v) \tag{2b}$$

where $E^{in}(v)$ is the Fourier transform of $E^{in}(t)$, $$c=1/\sqrt{\epsilon_0\mu_0} \tag{2c}$$

is the speed of light, $\epsilon_0$ and $\mu_0$ are the electric permittivity and magnetic permeability of free space, respectively, $v_0$ is the optical carrier frequency, and L is the length of the optically thin medium.

The spectral features in the medium interacting with the probe optical field results in feedback through a polarization given by Expression 3a, $$P(v)=\epsilon_0\chi(v)E^{in}(v) \tag{3a}$$

where $$\chi(v)=\chi'(v)+i\chi''(v) \tag{3b}$$

is the complex susceptibility of the material.

Often, the target spectral features to be measured are represented by the amplitude modifying absorption coefficient $\alpha(v)$ rather than the complex susceptibility, $\chi(v)$, since $\alpha(v)$ is the directly observed physical quantity in most of the measurements. The imaginary part of the complex susceptibility is related to the absorption coefficient through $$\chi''(v)\approx -\alpha(v)n_0/k_0 \tag{3c}$$

where $$k_0=2\pi v_0/c \tag{3d}$$

is the wave number ($2\pi$/wavelength) at the optical carrier frequency and $n_0$ is the refraction index of the material at that frequency. The real part of the complex susceptibility, which is responsible for the dispersion that modifies the phase of the probe field, is related to the imaginary part through Kramer-Kronig's relation, $$\chi'(v)=(2/\pi)\int_0^\infty s\chi''(s)/(s^2-v^2)ds \tag{3e}$$

The absorption coefficient of any arbitrary spectral feature can be decomposed as, $$\alpha(v)=\int_0^\infty \gamma(\tau)\cos[2\pi v\tau+\phi(\tau)]d\tau. \tag{4}$$

In the context of a spectral holographic absorption medium, $\alpha(v)$ is viewed as the sum of a series of sinusoidal spectral gratings, where $\gamma(\tau)$ is the amplitude and $\phi(\tau)$ is the phase of the spectral grating of period $1/\tau$.

The complex susceptibility is thus decomposed as, $$\chi(v)=-(in_0/k_0)\int_0^\infty \gamma(\tau)\exp[-i(2\pi v\tau+\phi(\tau))]d\tau \tag{5}$$

So that the temporal function of the output electric field is obtained as, $$E^{out}(t)=E^{in}(t)-\frac{Ln_0}{2}\int_0^\infty \gamma(\tau)\exp[-i\varphi(\tau)]E^{in}(t-\tau)d\tau. \tag{6}$$

In the case of chirped readout, the input probe field is expressed as, $$E_c^{in}(t)=E_0 e^{[i2\pi(v_s t+\kappa t^2/2)]} \tag{7a}$$

where $E_0$ is the amplitude of the field, $v_s$ is the start frequency of the chirp (in Hz) at t=0, and $\kappa$ is the chirp rate in Hz/sec. The output is the sum of the delayed weighted replicas of the chirped pulses and the transmitted chirped pulse. The intensity of the outbound field detected as the detected signal is $$|E_c^{out}(t)|^2=E_0^2+A\int_0^\infty \gamma(\tau)\cos(2\pi\kappa t\tau+\phi_t+\phi_q+\phi(\tau))d\tau \tag{7b}$$

where A is a constant depending on the intensity of the chirped optical field used as a probing optical field and the material. The term $$\phi_l=2\pi v_s\tau \tag{7c}$$

is the start frequency dependent phase, which is independent of the optical carrier frequency, and $$\phi_q=-\pi\kappa\tau^2 \tag{7d}$$

is the quadratic phase. Under the condition $$|\phi_q|<<\pi \text{ (i.e., } |\kappa\tau^2|<<1) \tag{7e}$$

the second term of Expression 7b is proportional to $\alpha(v)$ with the frequency scale to time scale conversion, $$v=\kappa t \tag{7f}$$

and an offset of $v_s/\kappa$ due to $\phi_l$. The output is a direct temporal map of the spectral features in the material, as in conventional absorption spectroscopy. The quadratic phase, $\phi_q$, is responsible for the significant deviation from the direct spectral mapping for chirp rates on the order of $1/\tau_{max}^2$ or greater, where $\tau_{max}$ is defined as $\gamma(\tau) \approx 0$ for $\tau > \tau_{max}$, where $1/\tau_{max}$ is related to the finest spectral feature of the absorption medium. In the case of a single Lorentzian spectral hole with full width at half maximum (FWHM) $\Gamma$, $\gamma(\tau) \propto \exp(-\Gamma\tau)$, and the distortion due to $\phi_q$ can only be ignored when $|\kappa| << \Gamma^2$. In general, the slow chirp readout limit $\kappa_{slow}$ is related to the finest structure $\delta\nu$ as given by $$|\kappa_{slow}| = \delta\nu^2 \quad (7g)$$

According to some embodiments of the invention, the quadratic phase is removed from the detected signal in post-processing. In a particular embodiment described in more detail below, with reference to FIG. 2B, a three-step post-detection data processing procedure is used to correct the detected time series.

Step 1: Fourier transform the detected signal intensity $|E_c^{out}(t)|^2$. The positive frequency components of the resulting transform are used for the following processing.

$$S(\nu \geq 0) = \int_{-\infty}^{\infty} |E_c^{out}(t)|^2 e^{-i2\pi\nu t} dt \quad (8a)$$
$$= (A\gamma(|\nu/\kappa|)/2\kappa) \exp[i(2\pi\nu_s\nu/\kappa - \pi\nu^2/\kappa + \varphi(|\nu/\kappa|))]$$
for $\nu \geq 0$ where $$\phi c = \exp[i\pi(2\nu_s\nu - \nu^2)/\kappa] \quad (8b)$$

is the phase term due to the chirped field. The linear phase term in $\phi c$ gives the frequency scale shifting and the quadratic phase in $\phi c$ results in the distortions.

Step 2: Compensate the linear and quadratic phase for positive frequencies $S(\nu \geq 0)$ using multiplier function correction factor C given by $$\exp[-i\pi(2\nu_s\nu - \nu^2)/\kappa] = C_1 C_2 \quad (9a)$$

yielding the corrected transform $S'(\nu)$ given by $$C\, S(\nu \geq 0) = S'(\nu) = A(\gamma(|\nu/\kappa|)/2\kappa)\exp[i\phi(|\nu/\kappa|)] \quad (9b)$$

The phase $\phi(|\nu/\kappa|)$ and the grating amplitude $\gamma(|\nu/\kappa|)$ are functions of the delay, $\tau = |\nu/\kappa|$, and carry the complete information of the original spectral features. The second term $C_2$ in C is given by $$C_2 = \exp(i\pi\nu^2/\kappa) \quad (9c)$$

and is used to compensate the quadratic phase. The first term C1 in C is given by $$\exp[-i\pi(2\nu_s\nu)/\kappa] \quad (9d)$$

and is for shifting the frequency scale to find the absolute frequency of the spectral features. It is noted that the frequency-dependent correction factors, $C_1$ and $C_2$ (and hence C) depend only on the constant chirp rate $\kappa$ and the start frequency $\nu_s$. For more complex chirps, the correction factors are expected to depend on other characteristics of the chirped laser field.

Step 3 Inverse Fourier transform the corrected transform that results from step 2. The restored spectrum is obtained as, $$S(t) = \int_{-\infty}^{\infty} S'(\nu) e^{i2\pi\nu t} d\nu \quad (10)$$
$$= A \int_0^{\infty} \gamma(\tau) \exp[i(2\pi\tau\kappa t + \varphi(\tau))] d\tau$$

The Fourier transform yields a complex function. The real part is proportional to $\alpha(\nu)$ that is associated with $\chi''(\nu)$ and the imaginary part is proportional to dispersion that is associated with $\chi'(\nu)$. The result from step 3 is the temporal mapping of the absorption features.

In some embodiments, the negative frequency components of the Fourier transform of the detected signal in step 1 can also be used for the spectral feature recovery processing. In these embodiments, the compensation multiplier is determined during step 2 as given by Expression 11.

$$\exp[-i\pi(2\nu_s\nu + \nu^2)/\kappa] \quad (11a)$$

This is equivalent to using the positive frequency components where both absorption and dispersion can be obtained. In some embodiments, both positive and negative frequency components are used for the recovery processing. In such embodiments, the compensation multiplier is $$\exp[-i\pi(2\nu_s\nu - sgn(\nu)\nu^2)/\kappa] \quad (11b)$$

It is again noted that the frequency-dependent correction factors, $^-C$ and $^{+/-}C$ depend only on the constant chirp rate $\kappa$ and the start frequency $\nu_s$. See T. Chang, M. Tian, R. K. Mohan, C. Renner, K. D. Merkel, W. R. Babbitt, "Recovery of spectral features readout with frequency-chirped laser fields", Optics Letters, 30(10), 1129, 2005 (hereinafter, Chang II), the entire contents of which are hereby incorporated by reference as if fully set forth herein.

2.2 Method for Recovering Optical Spectral Content

FIG. 2A is a flow diagram that illustrates at a high level a method 200 for recovering a target optical spectrum, according to an embodiment. Although steps are shown in FIG. 2A and subsequent flow charts in a particular order for purposes of illustration, in other embodiments some steps are performed in a different order, or overlapping in time, or one or more steps are omitted, or the steps are changed in some combination of ways. In an illustrated embodiment, method 200 is performed at recovery processor 140.

In step 210, chirp data is obtained that indicates properties of a chirped laser field 125 used to probe the target optical spectrum. Any method may be used to receive the chirp data. In some embodiments, values for one or more parameters that fully describe the chirped laser field are obtained from storage in a file on a computer-readable medium, or retrieved from a database, or received as manual input from a user, or received in a message from another process, such as a laser modulator control process, either unsolicited or in response to a request or prompt. In some embodiments, the chirped laser field itself is directly measured during step 210 at detector 128. In some embodiments a transform of the chirped laser field is received, e.g., the Fourier transform of the chirped laser field is received, during step 210. For a linear chirped laser field, the values of the constant chirp rate $\kappa$ and the start frequency $\nu_s$ are sufficient chirp data to describe the chirp properties. For non-linear chirped laser fields, other properties are included to fully characterize the chirp for determining phase correction factors. In some embodiments, the chirped laser field is received and recorded during step 210. The chirped field can be a digitized analog signal from the chirp generation or the chirp detection, or a digital signal regenerated from the chirp generation process or characterization process.

In step 220, a phase correction factor is determined based on the chirp data received during step 210. The distortion compensation multiplier is generated in one or more ways. For example, in various embodiments using a linear chirped laser field, at least one of correction factors C, $^-$C and $^{+/-}$C are determined based on constant chirp rate κ and the start frequency vs as given by Expressions 9a, 11a, 11b, respectively. In some embodiments in which the correction factor is applied in the time domain, as described in more detail below, step 220 includes taking the inverse Fourier transform of the correction factor. In some embodiments, the chirped laser field received and recorded during step 210 is subjected to a Fourier transform to produce the correction factor $^{+/-}$C.

In some embodiments the correction factor is generated by taking the Fourier transform of the frequency chirped probe field, designated $E_c(v)$. The correction factor is proportional to $$\frac{1}{E_c(v)}.$$

The difference between the correction factor and $$\frac{1}{E_c(v)}$$

is a phase term derived from the start frequency. Since the distortion results from the quadratic phase term that is dependent on the chirp rate, the phase term dependent on the start frequency can be ignored in some embodiments.

In step 230, a detected time series is received that is based on an interaction between the chirped laser field described in step 210 and a target optical spectrum. For example, a response signal 126 based on the interaction of a chirped laser field 125a and a target optical spectrum recorded in material 106 by previous interaction with the optical data signal 115 is detected at optical detector 128 and communicated to recovery processor 140. In some embodiments, the response signal 126 is received at detector 128 in heterodyne combination with a reference field 127 to produce an enhanced time series more suitable for detection and digitization by currently available high performance devices, and that signal is communicated to recovery processor 140.

In step 240, the detected time series received in step 230 is corrected based on the correction factor determined in step 220 to produce an output time series that maps in time the spectral content (e.g., amplitude and/or phase as a function of frequency) of the target optical spectrum. The chirp rate is used to translate the temporal changes in the output time series to frequency changes. The start frequency is used to determine the absolute frequency scale associated with the start of the output time series and can be assumed zero to simplify the data process if absolute frequency scale is not desired.

In some embodiments, control passes back to step 230 to receive more detected signals. As long as the same chirped optical field (or grating) is used to probe the target optical spectrum, neither the correction factor nor its Fourier transform need be recalculated.

Figure 2B:
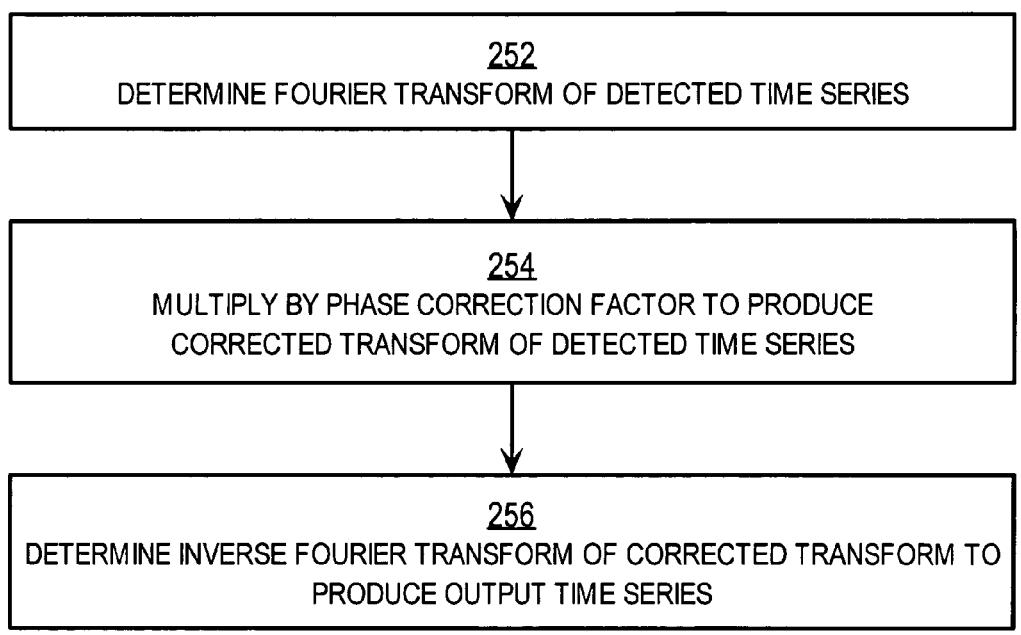
FIG. 2B is a flow diagram that illustrates in more detail a step of the method illustrated in FIG. 2A, according to an embodiment.

FIG. 2B is a flow diagram that illustrates in more detail a step of the method illustrated in FIG. 2A, according to an embodiment 241. Step 241 is a particular embodiment of step 240. Step 241 includes steps 252, 254, 256.

In step 252, the Fourier transform is determined for the detected time series. Any method may be used. There are efficient fast Fourier transform (FFT) software programs and microprocessor chips, which may be used in any combination to perform step 252.

In step 254, at each frequency, the spectral component in the Fourier transform is multiplied by the correction factor for the corresponding frequency as determined in step 220 to produce a corrected transform. For example, the amplitude of the Fourier transform of the detected series for frequency v is multiplied by the value of C at frequency v, as given by Expression 9a, above, to produce the amplitude and phase of the corrected transform at that frequency.

In step 256, the inverse Fourier transform is performed to produce the output time series that maps the spectral content of the target optical spectrum. Any method may be used as described above for step 252. There are efficient fast Fourier transform (FFT) software programs and microprocessor chips, which may be used in any combination to perform step 256.

Figure 2C:
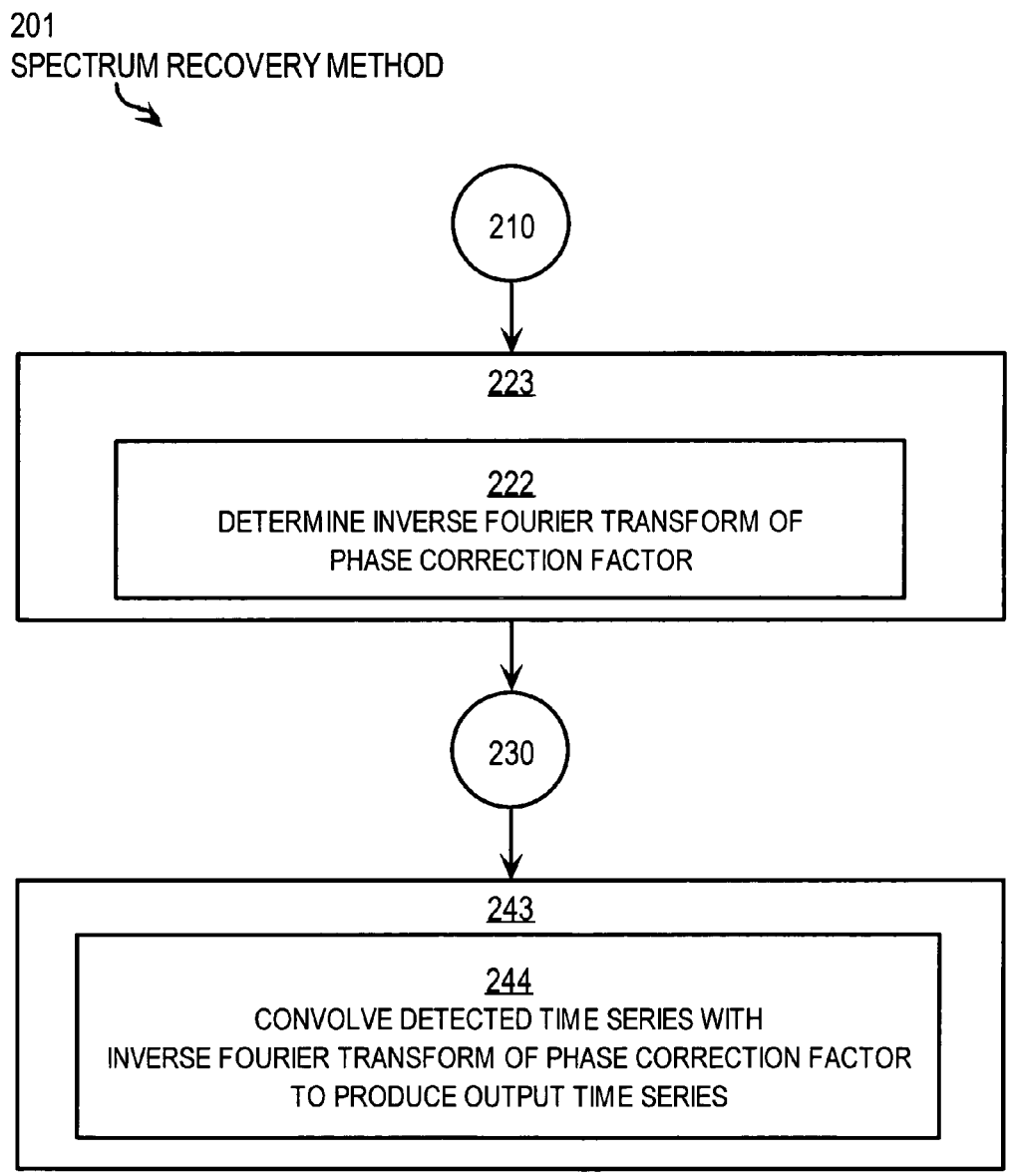
FIG. 2C is a flow diagram that illustrates in more detail an embodiment of the method illustrated in FIG. 2A.

FIG. 2C is a flow diagram that illustrates in more detail an embodiment 201 of the method illustrated in FIG. 2A. Method 201 is a particular embodiment of step 200, and includes an alternative to step 241. Method 201 implements the correction in the time domain using convolution, the mathematical equivalent of multiplication in the Fourier transform domain. The time domain data processing may be more computationally complex and may require different hardware than used in the Fourier transformed domain. Method 201 includes steps 210, 223, 230, 243. Steps 210 and 230 are as described above for method 200.

Step 223 is a particular embodiment of step 220, described above. Step 223 includes step 222. In step 222, the inverse Fourier transform of the correction factor is determined. Any method may be used to take the inverse Fourier transform of the correction factor, as described above for steps 252 and 256. There are efficient fast Fourier transform (FFT) software programs and microprocessor chips, which may be used in any combination to perform step 222. In some embodiments, the inverse Fourier transform of the correction factor is determined analytically. For the case of a LFM probe, the analytical inverse Fourier transform of the correction factor results in a time series that describes the LFM with an chirp rate opposite to that of the probe.

Step 243 is a particular embodiment of step 240, described above. Step 243 includes step 244. In step 244 the corrected output time series that maps the spectral content is determined by convolving the transformed correction factor with the detected time series.

3. Example Embodiments

The invention is further described in the following simulated and experimental embodiments. These embodiments show example distorted detected time series detected at detector 128, and corrected output time series produced by recovery processor 140 that maps the spectral content of a known target optical spectrum. In practice, the target optical spectrum is not known a priori. These examples instill confidence that the recovery process generates output time series that very accurately map, and therefore recover, the spectral content of the target optical spectrum.

The computer based simulations of the spectrum recovery in this section were performed under the assumption of ideal probe field and detector, unless otherwise indicated.

3.1 Simulated Data and Detected Signals

Figure 3A:
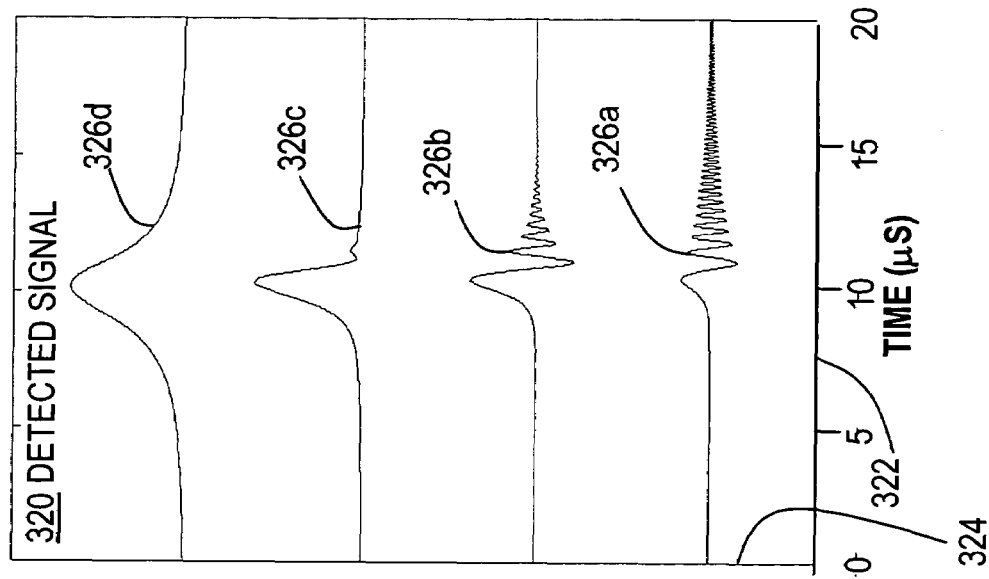
FIG. 3A is a graph that shows spectral peaks in four simulated target optical spectra recorded in an optical material, vertically offset.

Computer based simulations of signal spectrum recovery presented in this section were performed under the assumption of ideal probe field and detector. FIG. 3A is a graph 310 that shows spectral peaks in four simulated target optical spectra, vertically offset. The horizontal axis 312 represents frequency in MegaHertz (MHz, 1 MHz=$10^6$ Hz, 1 Hz=1 cycle per second) relative to an optical carrier frequency, increasing to the right. The vertical axis 314 represents absorption coefficient in arbitrary units. Plotted on graph 310 are traces 316a, 316b, 316c, 316d (collectively referenced hereinafter as traces 316) representing target optical spectra stored as optical absorption variations in an optical material (e.g., 106), each with a single absorption spike at the carrier frequency but with increasing spectral width $\Gamma$. Each trace is offset vertically from the other traces to avoid obscuring details. The spectral widths are 0.1 MHz, 0.3 MHz, 1.0 MHz and 3.0 MHz for traces 316a, 316b, 316c, 316d, respectively.

Figure 3B:
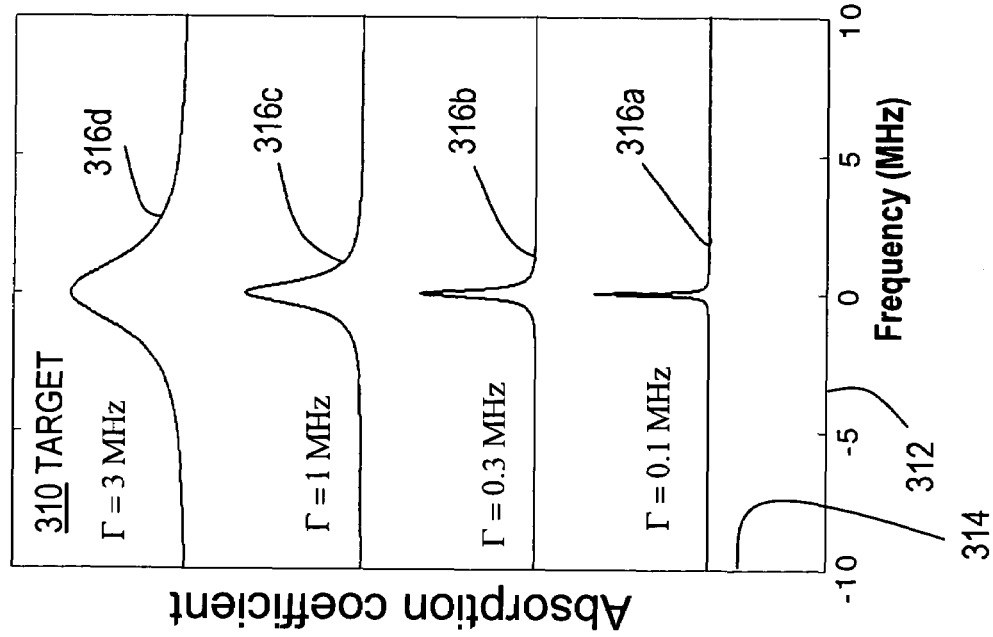
FIG. 3B is a graph that shows four simulated detected signals for the four target optical spectra shown in FIG. 3A, vertically offset.

FIG. 3B is a graph 320 that shows four simulated detected signals for the four target optical spectra shown in FIG. 3A, vertically offset. The horizontal axis 322 represents time in microseconds ($\mu$s, 1 $\mu$s=$10^{-6}$ seconds) relative to detection start time, increasing to the right. The vertical axis 324 represents received intensity in arbitrary units, decreasing upward. Plotted on graph 320 are traces 326a, 326b, 326c, 326d (collectively referenced hereinafter as traces 326) representing detected signals based on a chirped laser field with constant chirp rate, $\kappa$=1 MHz/$\mu$s (=1 MHz$^2$), interacting with the absorption variations depicted by traces 316a, 316b, 316c, 316d, respectively, and combined at the detector with the transmitted chirped laser field for a heterodyne measurement in collinear geometry. Each trace is offset vertically from the other traces to avoid obscuring details. These traces represent examples of the detected time series received during step 230, described above. Distortions are evident as diminished peak height and ringing structures in each trace, increasing with decreasing width of the peak in the target optical spectrum as $\kappa$=$\Gamma^2$ (trace 316c) and exceeds $\Gamma^2$ (traces 316b, 316a).

FIG. 3C is a graph 330 that shows four corrected output signals for the four target optical spectra shown in FIG. 3A, vertically offset, according to an embodiment. The horizontal axis 332 represents frequency in MHz as determined from the time axis 322 of the detected signal, the constant chirp rate (1 MHz/$\mu$s) and the chirp start frequency. The vertical axis 334 represents corrected intensity in arbitrary units, decreasing upward. Plotted on graph 330 are traces 336a, 336b, 336c, 336d (collectively referenced hereinafter as traces 336) representing corrected time series for the detected time series 326a, 326b, 326c, 326d, respectively. These traces 336 result after the correction factor C (Expression 9a) is computed in step 220 and applied to the detected time series (traces 326) in four instances of step 240. In the illustrated embodiment, the correction was applied as described above for step 241 in FIG. 2B, by taking the Fourier transform of the detected traces 326 in step 252, multiplying by the correction factor in step 254 and taking the inverse transform in step 256 to produce the corrected output time series (traces 336).

When the chirp rate is fast, $\kappa$>$\Gamma^2$, the detected signals (traces 326a, 326b) are severely distorted. The recovered spectra (traces 336) show the restoration of the original spectral shape in the target optical spectra (traces 316). When the chirp rate is at the slow chirp limit, $\kappa$=$\Gamma^2$ (trace 326c), the distortions of the detected signal are still significant. Even when the chirp rate is much slower than the slow chirp limit, $\kappa$<<$\Gamma^2$ (traces 326d), when the direct mapping condition of conventional absorption spectroscopy is being met, there are still slight distortions in the detected signal. In all cases, the recovery procedure produces accurate mappings and therefore recovery of the target optical spectra.

Figure 4A:
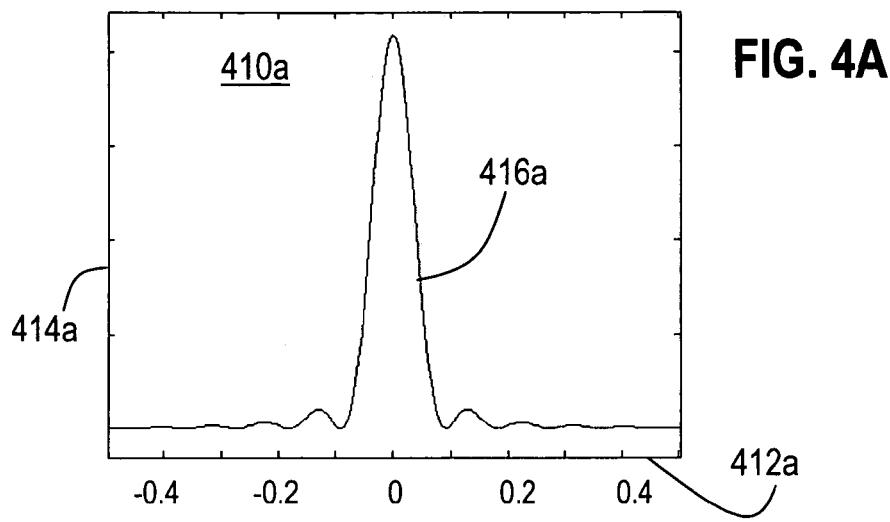
FIG. 4A, FIG. 4B, FIG. 4C are graphs that show spectral peaks in three simulated target optical spectra recorded in an optical material.
Figure 4B:
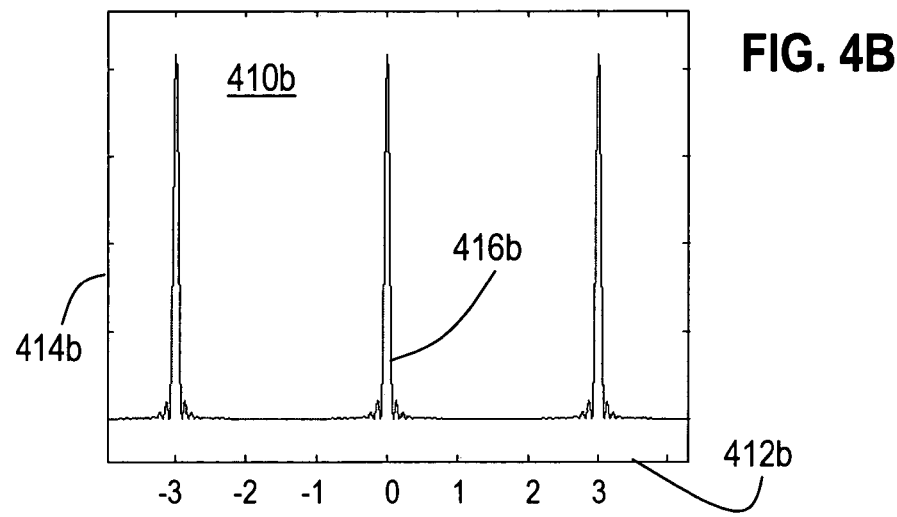
Figure 4C:
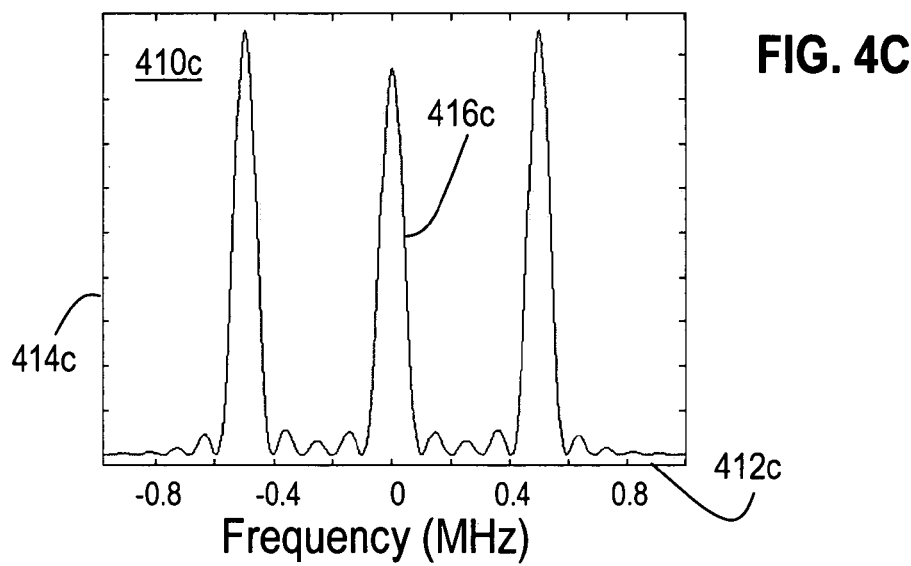

The recovery procedure even works when distortions overlap in time and do not appear as the distinctive ringing of isolated peaks. This effect is described with reference to FIG. 4A through FIG. 4I. FIG. 4A, FIG. 4B, FIG. 4C are graphs 410a, 410b, 410c that show spectral peaks in three simulated target optical spectra. The horizontal axes 412a, 412b, 412c represent frequency in MHz relative to an optical carrier frequency, increasing to the right. The vertical axes 414a, 414b, 414c represent the spectral feature depth in arbitrary units, increasing upward. Plotted on graphs 410a, 410b, 410c are traces 416a, 416b, 416c (collectively referenced hereinafter as traces 416), respectively, representing target optical spectra stored as optical absorption variations in an optical material (e.g., 106). Each trace has one or more absorption peaks with a width $\Gamma$=0.1 MHz (like the peak in trace 316a that produced substantial distortion); thus $\Gamma^2$=0.01 MHz$^2$. Trace 416b includes three such peaks spaced 3 MHz apart; and trace 416c includes three such peaks spaced 0.5 MHz apart.

Figure 4D:
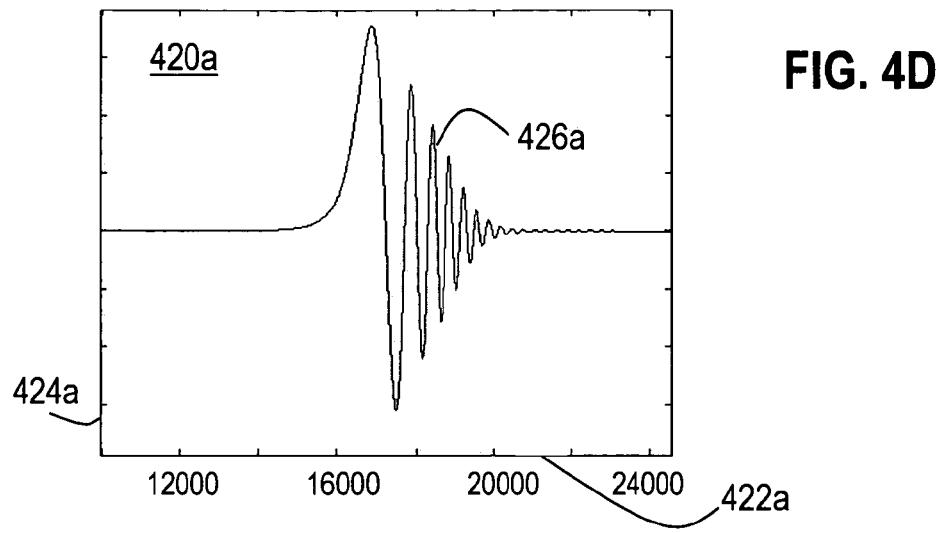
FIG. 4D, FIG. 4E, FIG. 4F are graphs that show three simulated detected signals for the three simulated target optical spectra shown in FIG. 4A, FIG. 4B, FIG. 4C, respectively.
Figure 4E:
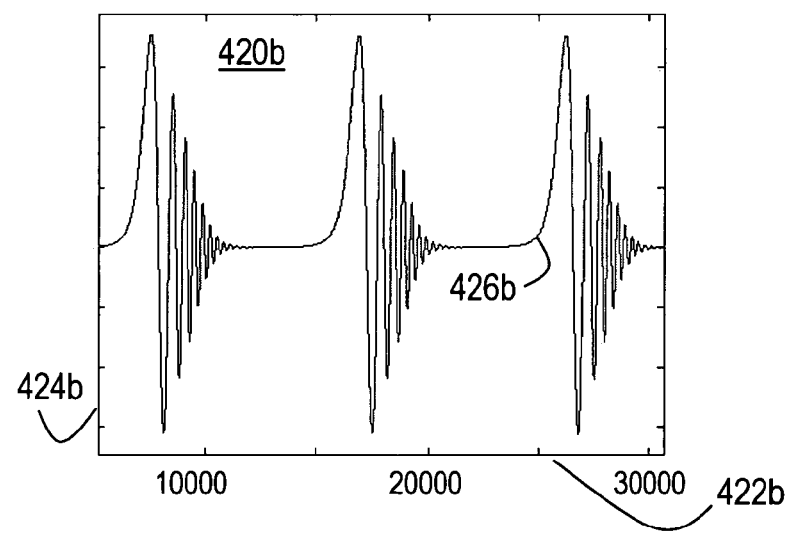
Figure 4F:
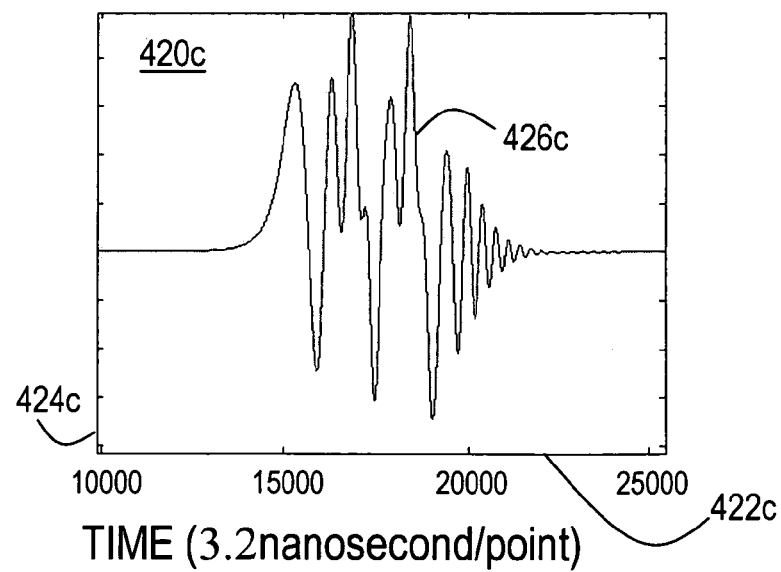

FIG. 4D, FIG. 4E, FIG. 4F are graphs 420a, 420b, 420c that show three simulated detected signals for the three simulated target optical spectra shown in FIG. 4A, FIG. 4B, FIG. 4C, respectively. The horizontal axes 422a, 422b, 422c represent time in 3.2 nanoseconds per point, increasing to the right. The vertical axes 424a, 424b, 424c represent the heterodyne readout signal intensity after a photo-detection process, in arbitrary units, increasing upward. Plotted on graphs 420a, 420b, 420c are traces 426a, 426b, 426c (collectively referenced hereinafter as traces 426), respectively. Traces 426 represent detected signals based on a chirped laser field with constant chirp rate, $\kappa$=0.1 MHz/$\mu$s (=0.1 MHz$^2$), interacting with the absorption variations depicted by traces 416a, 416b, 416c, respectively, and combined at the detector with the transmitted chirped laser field for a heterodyne measurement in collinear geometry. The constant chirp rate of the probe field is ten times faster than the slow chirp limit, $\Gamma^2$=0.01 MHz$^2$. While traces 426a, 426b show the distinctive ringing pattern associated with isolated peaks, trace 426c in which the distortions overlap shows a complex pattern that is not easily recognized as a particular number of peaks.

Figure 4G:
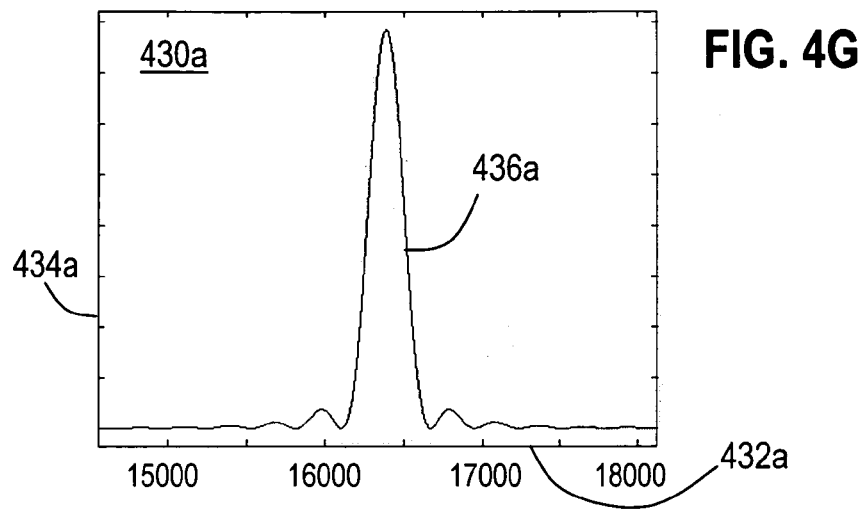
FIG. 4G, FIG. 4H, FIG. 4I are graphs that show three corrected output signals for the three simulated target optical spectra shown in FIG. 4A, FIG. 4B, FIG. 4C, respectively, according to an embodiment.
Figure 4H:
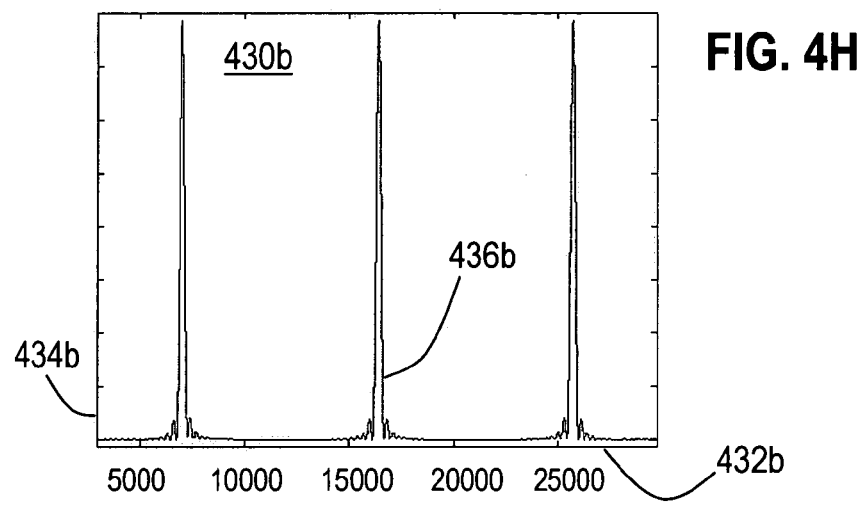
Figure 4I:
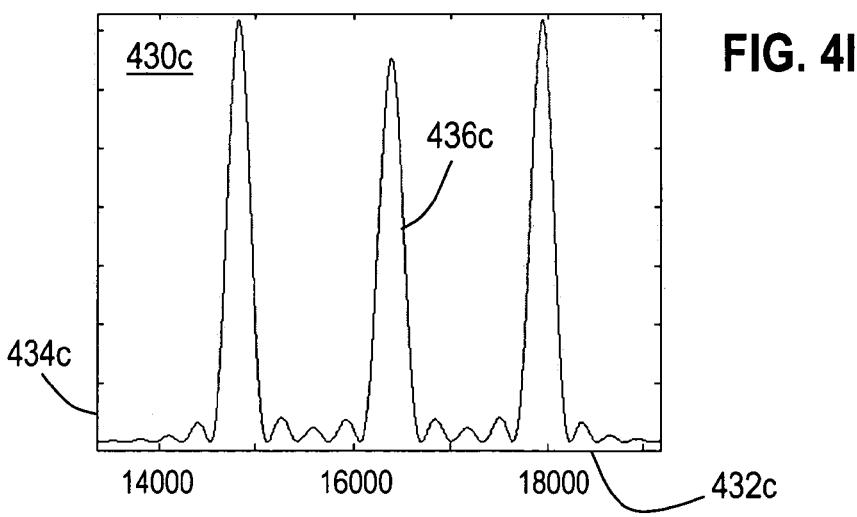

FIG. 4G, FIG. 4H, FIG. 4I are graphs 430a, 430b, 430c that show three corrected output signals for the three simulated target optical spectra shown in FIG. 4A, FIG. 4B, FIG. 4C, respectively, according to an embodiment. The horizontal axes 432a, 432b, 432c represent time in 3.2 nanoseconds per point, increasing to the right (in other embodiments, these axes are converted to frequency using the chirp rate and start frequency). The vertical axes 434a, 434b, 434c represent the recovered spectral feature depth in arbitrary units, increasing upward. Plotted on graph 430 are traces 436a, 436b, 436c (collectively referenced hereinafter as traces 436) representing corrected time series for the detected time series 426a, 426b, 426c, respectively.

The recovered spectra in traces 436 faithfully reproduce the shape of the target optical spectra in traces 416; and thus demonstrate the effectiveness of the recovery technique even with overlapping distortions from different spectral features.

Figure 5:
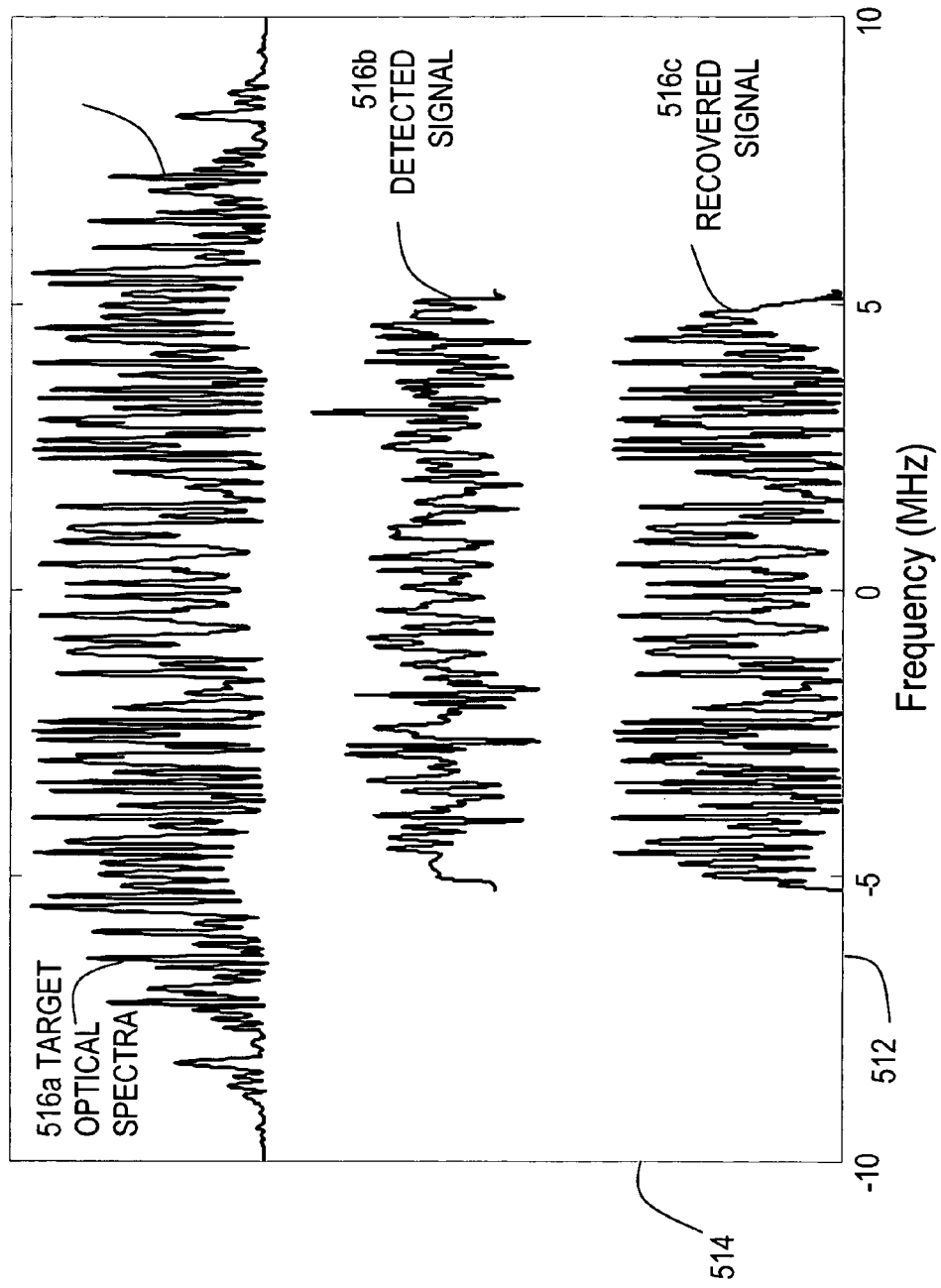
FIG. 5 is a graph that shows spectral features in a simulated arbitrary absorption spectrum in an optical material, along with detected and corrected signals.

FIG. 5 is a graph 510 that shows spectral features in a simulated arbitrary absorption spectrum in an optical material. The horizontal axis 512 represents frequency in MHz relative to an optical carrier frequency, increasing to the right. The vertical axis 514 represents signal strength in arbitrary units. Plotted on graph 510 are traces 516a, 516b, 516c, vertically offset to avoid obscuring their details.

Trace 516a represents a complex target optical spectrum stored as optical absorption variations in an optical material (e.g., 106). The spectral features are stored into material which corresponds to the power spectral of a pseudo-random bi-phase pattern at 10 megabits per second and pattern duration, $\tau_p=10$ μs. Therefore, the finest feature, $\Gamma=0.1$ MHz, in trace 516a is determined by the pattern duration.

Trace 516b represents the detected signal when probed with a chirped laser field. The probing chirped laser has a bandwidth B=10.4 MHz and chirp duration τc=104 μs. The chirp duration τc includes rising and falling edges of 2 μs each and corresponding frequency scanning of 0.2 MHz each. The chirp rate, $\kappa=0.1$ MHz/μs, is ten times faster than the slow chirp limit $\Gamma^2=0.01$ MHz$^2$. This causes significant deviation of the detected signal in trace 516b from the target optical spectrum in trace 516a. The bandwidth B does not encompass the entire spectrum of the target optical spectrum represented by trace 516a, so the detected signal 516b is correspondingly limited in bandwidth.

It is here noted that in realistic detected signals as shown in trace 516b, the resonant ringing associated with quadratic phase is not evident. Therefore, it is not evident that correction factors based on the quadratic phase of the chirped laser field is effective in recovering the target optical spectrum.

Trace 516c represents the recovered spectrum obtained by applying method 200 with step 241. The recovered spectrum, trace 516c, shows an accurate match of the spectral features in the target optical spectrum, trace 516a, over the probed bandwidth. Only at the ends of the spectrum are there remaining distortions. To avoid such edge effects, it is recommended that extra bandwidth of about κ/Γ be added to the chirped laser field around the bandwidth of interest.

3.2 Experimental Data and Detected Signals

An embodiment of the spectral recovery technique has been experimentally demonstrated using a spectral hole burning crystal, Tm$^{3+}$: YAG, at 4.2K, as the optical material 106. The optical length is around αL=1. A frequency stabilized diode laser (line width less than 100 kHz) tuned to the absorption resonance of Tm$^{3+}$ at 793.380 nanometers (nm, 1 nm=10$^{-9}$ meters) is used as laser source 102. A radio frequency (RF) signal from an arbitrary waveform generator (AWG) was used as input signal source 114, and was modulated onto the optical carrier by an AOM in place of EOPMs 116. The crystal (optical material 106) was illuminated with the modulated light for 100 μs. Spectral holes due to driving the AOM with RF frequencies of 262, 263, 264, and 270 MHz were engraved in the crystal. The hole widths, estimated at 0.2 MHz, result from the recording time, laser line width, and the coherence decay time (about 20 μs). Two digital chirps of bandwidth B=20 MHz were generated with an AOM substituted for EOPM 124 and driven by the AWG 129. The chirp durations, τc, were 100 μs ($\kappa=0.2$ MHz/μs) and 20 μs ($\kappa=1.0$ MHz/μs). These chirp rates are 5 times and 25 times, respectively, faster than the conventional chirp rate limit given by $\Gamma^2=0.04$ MHz$^2$. The chirped laser fields are directed onto crystal 106 on the same spatial mode for automatic heterodyne detection.

FIG. 6A is a graph 620a that shows a detected signal for an experimental target optical spectrum with four spectral holes and a chirped laser field with a first chirp rate. The first chirp rate is $\kappa=0.2$ MHz/μs. The horizontal axis 622a represents frequency in MHz relative to an optical carrier frequency, increasing to the right, determined from elapsed time based on the first constant chirp rate. The vertical axis 624a represents normalized signal strength in arbitrary units. Plotted on graph 620a is trace 626a, representing the detected signal. Distortion is evident, masking the clean spectral holes of the target optical spectrum actually burned into crystal 106.

FIG. 6B is a graph 630a that shows the corrected output signal for the detected signal shown in FIG. 6A, according to an embodiment. The horizontal axis 622a is shared with graph 620a. The vertical axis 634a represents normalized signal strength in arbitrary units, offset vertically from the vertical axis of graph 620a. Plotted on graph 630a is trace 636a, representing the corrected output signal. The corrected signal, trace 636a, successfully recovers the frequency and shape of the spectral holes of the target optical spectrum actually burned into crystal 106.

FIG. 6C is a graph 620b that shows a detected signal for an experimental target optical spectrum with four spectral holes and a chirped laser field with a second chirp rate. The second chirp rate is $\kappa=1.0$ MHz/μs. The horizontal axis 622b represents frequency in MHz relative to an optical carrier frequency, increasing to the right, determined from elapsed time based on the second constant chirp rate. The vertical axis 624a is shared with graph 620a. Plotted on graph 620b is trace 632b, representing a detected signal. Distortion is evident and greater than in trace 626a, further masking the clean spectral holes of the target optical spectrum actually burned into crystal 106.

FIG. 6D is a graph 630b that shows the corrected output signal for the detected signal shown in FIG. 6C, according to an embodiment. The horizontal axis 622b is shared with graph 620b. The vertical axis 634a is shared with graph 630a. Plotted on graph 630b is trace 636b, representing the corrected output signal. The corrected signal, trace 636b, successfully recovers the frequency and shape of the spectral holes of the target optical spectrum actually burned into crystal 106.

In the detected signal, trace 626a, with κ=0.2 MHz/μs, the frequencies of primary spectral features can be resolved, but the shapes are distorted. The detected signal, trace 626b, with κ=1.0 MHz/μs has significant distortions due to the interference between the temporally overlapping coherent responses. The frequencies of the spectral features in the target optical spectrum can not be resolved. The lower traces 636a, 636b show the recovered spectra that are almost identical for these two chirp rates and clearly show the four distinct peaks in the target optical spectrum at 262, 263, 264 and 270 MHz. The small difference is due to laser phase and amplitude fluctuations in the burning and readout processes. It is noted that the recovered spectrum for the higher chirp rate, trace 636b, has less noise. This observation in discussed in more detail in the next section. The experiment indicates that this embodiment of the technique works well to correct actual distortions observed in optical analog processing.

3.3 Effects of Noise

The spectrum recovery technique is tested through simulation in the presence of laser source noise. The linear frequency chirped laser in all these embodiments had limited coherence time, 50 µs in the simulation.

Figure 7B:
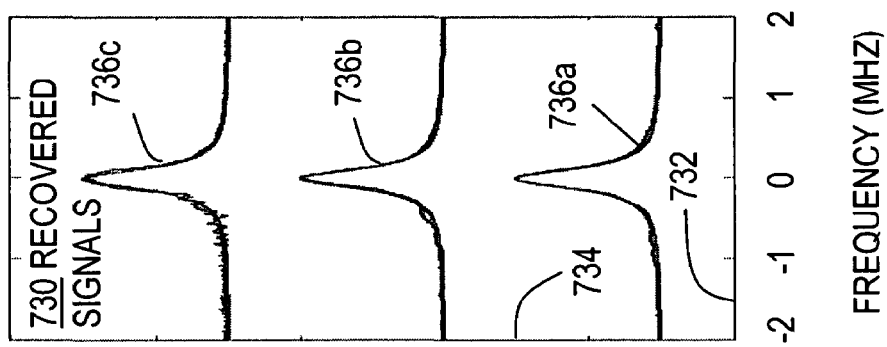
FIG. 7B is a graph that shows the three corrected output signals for the noisy simulated detected signal shown in FIG. 7A, vertically offset, according to an embodiment.
Figure 7A:
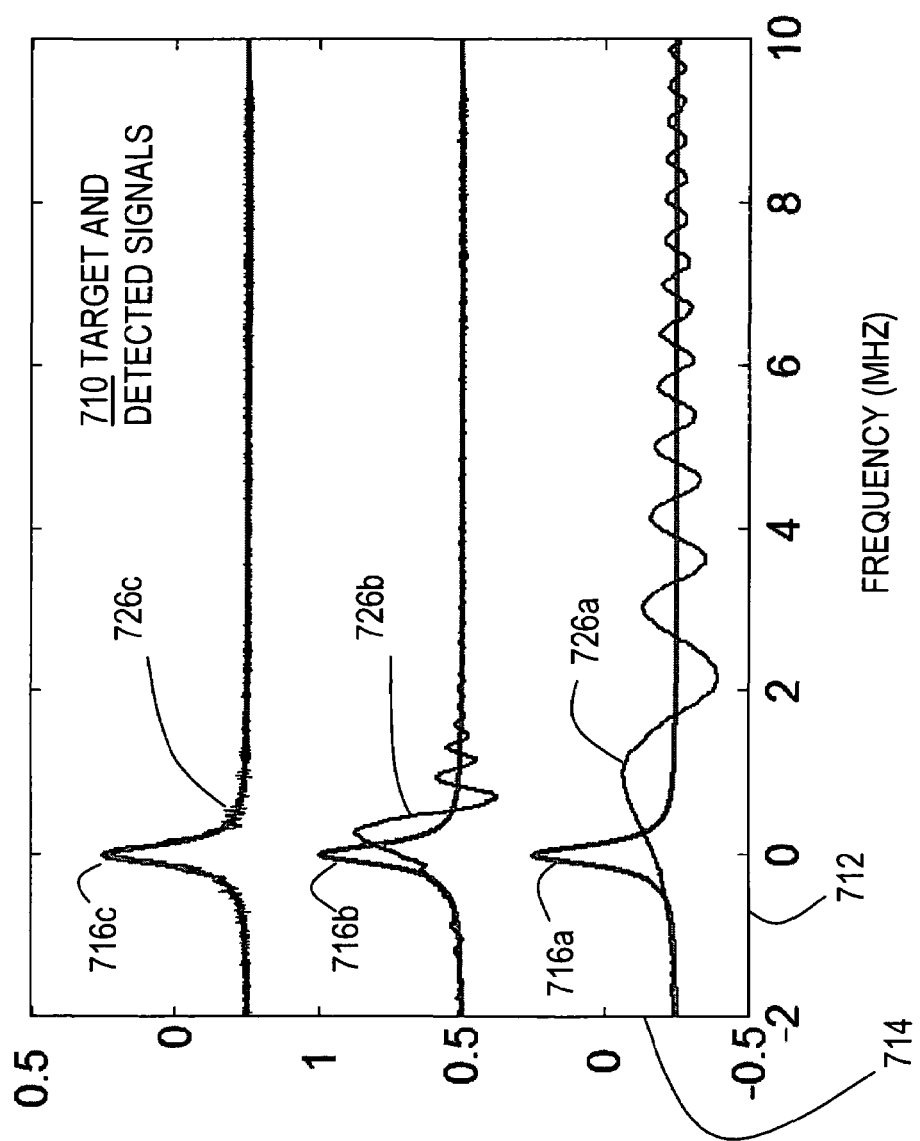
FIG. 7A is a graph that shows a simulated target optical spectrum and simulated detected signal when the chirped laser field is subject to noise for three chirp rates, vertically offset.

FIG. 7A is a graph 710 that shows simulated target optical spectrum and simulated detected signal when the chirped laser field is subject to noise for three chirp rates, vertically offset. The horizontal axis 712 represents frequency in MHz relative to an optical carrier frequency, increasing to the right. The vertical axis 714 represents signal strength in arbitrary units. Plotted on graph 710 are traces 716a, 716b, 716c (collectively referenced hereinafter as traces 716) representing target optical spectra stored as optical absorption variations in an optical material (e.g., 106), each with a single absorption spike (a Lorentzian spectral hole) at the carrier frequency with the same spectral width, Γ=0.3 MHz. Each trace is offset vertically from the other traces to avoid obscuring details. Also plotted on graph 710 are traces 726a, 726b, 726c (collectively referenced hereinafter as traces 726) representing detected signals based on a chirped laser field with three different constant chirp rates κ. The constant chirp rates are κ=4.0 MHz/µs, κ=0.4 MHz/µs, κ=0.04 MHz/µs for traces 726a, 726b, 726c, respectively. Each detected signal trace 726 is offset vertically from the other traces 726 to avoid obscuring details. Each detected signal trace 726 is aligned with a corresponding target optical spectrum trace 716. Also shown in graph 710 are the temporal durations 728a, 728b, 728c of the detected signals 726a, 726b, 726c, respectively, that correspond to 2 MHz on the frequency axis 712. These temporal durations corresponding to 2 MHz are 1 µs, 10 µs and 100 µs for detected signals 726a, 726b, 726c, respectively.

FIG. 7B is a graph 730 that shows the three corrected output signals for the noisy simulated detected signal shown in FIG. 7A, respectively, vertically offset, according to an embodiment. The horizontal axis 732 represents frequency in MHz as determined from the time axis of the detected signal, the constant chirp rate and the chirp start frequency. The vertical axis 734 represents corrected intensity in arbitrary units. Plotted on graph 730 are traces 736a, 736b, 736c (collectively referenced hereinafter as traces 736) representing corrected output time series for the detected time series 726a, 726b, 726c, respectively. As can be seen, the recovered spectral features in the corrected time series 736 match well the shape of the target optical spectrum given by traces 716.

The corresponding recovered spectra 736 demonstrate the effectiveness of the spectrum recovery technique in the presence of phase noise on the optical probe field. In each case, the target optical spectrum is recovered, but the corrected signal shows decreasing noise with increasing chirp rate. For example, trace 736a shows less noise than trace 736b which shows less noise than trace 736c. The fastest chirp, producing detected signal trace 726a and corrected trace 736a, requires a shorter time (a few µs) to obtain the most significant information regarding the target optical spectrum, and thus benefits most from the laser coherence time, 50 µs. Therefore, the spectrum recovery may reduce the requirements on the frequency stability for the frequency chirped laser source, e.g., laser 122.

3.4 Effects of Spectral Feature Width and Separation

When mapping an unknown spectrum with a chirped optical field of chirp rate κ, the impulse response of the features within certain frequency ranges interfere with each other. The spectrum recovery technique is able to correct the crosstalk between the neighboring spectral features, as demonstrated above with reference to FIG. 4F. In this section it is shown that the spectrum recovery technique is able to correct the crosstalk between a narrow feature near a relatively broad feature with reference to FIG. 8A, FIG. 8B and FIG. 8C.

Figure 8A:
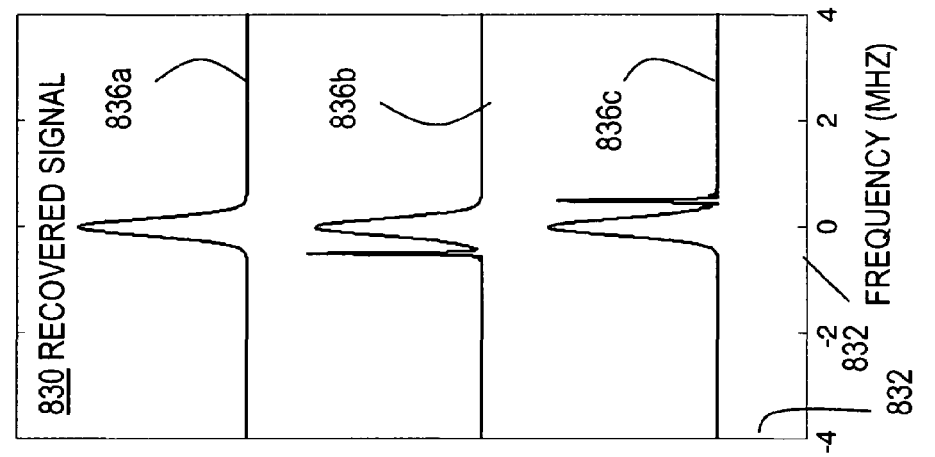
FIG. 8A is a graph that shows spectral peaks of various width in three simulated target optical spectra in a material, vertically offset.

FIG. 8A is a graph 810 that shows spectral peaks of various width in three simulated target optical spectra, vertically offset. The horizontal axis 812 represents frequency in MHz relative to an optical carrier frequency, increasing to the right. The vertical axis 814 represents absorption coefficient in arbitrary units. Plotted on graph 810 are traces 816a, 816b, 816c (collectively referenced hereinafter as traces 816) representing target optical spectra stored as optical absorption variations in an optical material (e.g., 106). Each trace is offset vertically from the other traces to avoid obscuring details. Each trace 816 includes one peak with width Γ=0.45 MHz centered at the optical carrier frequency. Trace 816b includes a narrow peak with width Γ=0.045 MHz below the carrier frequency. Trace 816c includes a narrow peak of the same width above the carrier frequency.

Figure 8B:
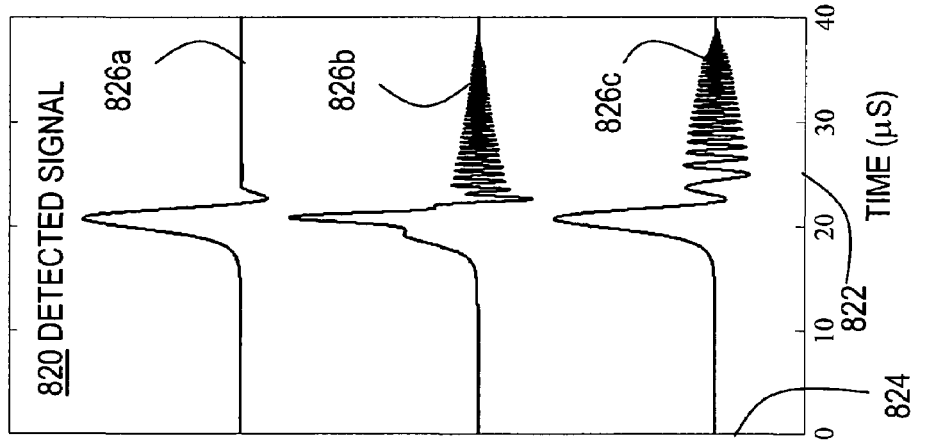
FIG. 8B is a graph that shows three simulated detected signals for the three target optical spectra shown in FIG. 8A, vertically offset.

FIG. 8B is a graph 820 that shows three simulated detected signals for the three target optical spectra shown in FIG. 8A, vertically offset. The horizontal axis 822 represents time in µs relative to detection start time, increasing to the right. The vertical axis 824 represents signal strength in arbitrary units. Plotted on graph 820 are traces 826a, 826b, 826c (collectively referenced hereinafter as traces 826) representing detected signals based on a chirped laser field with constant chirp rate, κ=0.2 MHz/µs, interacting with the absorption variations depicted by traces 816a, 816b, 816c, respectively, and combined at the detector with the transmitted chirped laser field for a heterodyne measurement in collinear geometry. Each trace is offset vertically from the other traces to avoid obscuring details. The probe chirp rate is near the slow chirp limit with respect to the broad feature and suffers some distortion, but the chirp rate is too fast to resolve the narrow feature, resulting in extensive distortion of the narrow feature. The distortions overlap in traces 826b, 826c. The extensive distortion caused by the narrow feature spreads across the broad feature response in trace 826b, so that both of the features are highly distorted in the detected signal 826b.

Figure 8C:
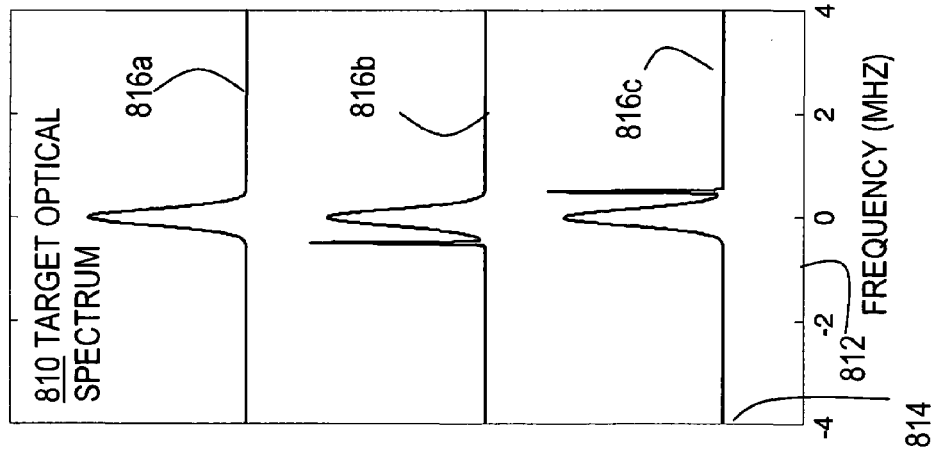
FIG. 8C is a graph that shows three corrected output signals for the three target optical spectra shown in FIG. 8A, vertically offset, according to an embodiment.

FIG. 8C is a graph 830 that shows three corrected output signals for the three target optical spectra shown in FIG. 8A, vertically offset, according to an embodiment. The horizontal axis 832 represents frequency in MHz as determined from the time axis 822 of the detected signal, the constant chirp rate and the chirp start frequency. The vertical axis 824 is shared with graph 820. Plotted on graph 830 are traces 836a, 836b, 836c (collectively referenced hereinafter as traces 836) representing corrected time series for the detected time series 826a, 826b, 826c, respectively.

The traces 836a, 836b, 836c closely resemble the shape of the target optical spectrum depicted by traces 816a, 816b, 816c, respectively. Thus, the recovered spectra demonstrate that the recovery technique enables accurate mapping of arbitrary spectral features of arbitrary resolution. Prior knowledge about the width of the features, even the width of the smallest features, is not needed to set the chirp rate κ.

The recovery technique removes the distortions, but the spectral resolution is still limited by the bandwidth of the detector 128. FIG. 9A is a graph 910 that shows spectral peaks of various width in three simulated target optical spectra, vertically offset. These simulated target optical spectra are the same as in graph 810, described above. The horizontal axis 912 represents frequency in MHz relative to an optical carrier frequency, increasing to the right. The vertical axis 914 represents absorption coefficient in arbitrary units. Plotted on graph 910 are traces 916a, 916b, 916c (collectively, referenced hereinafter as traces 916) that are identical to trace 816a, 816b, 816c, respectively, described above.

FIG. 9B is a graph 920 that shows three simulated detected signals for the three target optical spectra shown in FIG. 9A, respectively, vertically offset, when the detector has a bandwidth that does not resolve narrow features. The horizontal axis 922 represents time in µs relative to detection start time, increasing to the right. The vertical axis 924 represents signal strength in arbitrary units. Plotted on graph 920 are traces 926a, 926b, 926c (collectively referenced hereinafter as traces 926) representing detected signals at a detector with a bandwidth of 1 MHz. A detector bandwidth of 1 MHz can resolve temporal changes only on the order of 1 µs, which is not sufficient to resolve the variations shown in traces 826b, 826c. Thus the detector averages those variations. The narrow band detector modifies the distortions, as shown in traces 926 compared with traces 826.

FIG. 9C is a graph that shows three corrected output signals for the three target optical spectra shown in FIG. 9A, vertically offset, according to an embodiment. The horizontal axis 932 represents frequency in MHz as determined from the time axis 922 of the detected signal, the constant chirp rate and the chirp start frequency. The vertical axis 924 is shared with graph 920. Plotted on graph 930 are traces 936a, 936b, 936c (collectively referenced hereinafter as traces 936) representing corrected time series for the detected time series 926a, 926b, 926c, respectively.

The distortions are reduced in traces 936, but the narrow peak is not resolved. Therefore, the recovery technique can be applied and will reduce, but not eliminate, distortions even for features that are not fully resolved by a detector. However, the technique does not recover features that are not resolved by the detector.

4. Example Applications

In various embodiments, the method 200 is applied in many applications and technical fields.

4.1 Heterodyne Detection Embodiments

The experimental and simulated detections described above were in collinear embodiments. In some other embodiments, the method is applied to other heterodyne geometries.

In the chirped readout of spectral absorptive or dispersive features without spatial structures, the transmitted field and impulse response (photon echoes) are inherently aligned, which is called collinear geometry. Heterodyne detection is automatically achieved because, for example, a non-delayed transmitted version of the probe field serves as the reference field. When the interaction of the chirped field is with a spatial-spectral grating, the optical response field propagates, in general, in a different direction from the optical transmitted field. In this case, the optical response field is preferably mixed with either the optical transmitted field or with the input chirp optical field to achieve heterodyne detection. This separation of the response field from the reference field can happen when measuring spectral features in diffraction, scattering, and reflection. In such cases, the reference field beats with the response field to achieve heterodyne detection. In various embodiments the reference field is an exact or attenuated or delayed replica of the chirped optical field, or is a separately generated chirped optical field. The phase correction is determined once for each probe field and applied to each heterodyne detection that uses the same probing chirped optical field.

4.2 Detector Arrays

Arrays of detectors can simultaneously measure responses on multiple spatial modes. In various embodiments, the correction step is applied separately on each spatial mode.

Spatial imaging of an object is usually performed in two ways. One is to use an optical system to image the object onto a 2D detector array. Examples of such systems include microscopes, cameras, and telescopes, where the spatial information is processed in parallel. Another way is to spatially scan the illuminating light source on the object with a single detector or linear array of detectors, as done in scanners. The detected signals are collected in series, then the spatial image of the object is reconstructed with the recorded information.

The spectrum of a spatial object is of great interest in many systems, ranging from remote stars to soft tissues in animal organs. One intensively used technique is absorption imaging spectroscopy, where a tunable laser is used as the illuminating source and the absorption of the object is monitored to construe the image. The absorption image of the object is obtained as the function of the laser frequency that is swept in time. The spectrum recovery technique of the current invention applies to these types of applications. The frequency sweep rate is often fast compared to the spectral features. Without the spectral recovery techniques of the current invention, the slow limit set by the finest spectral feature applies. At least some embodiments of the present invention allows fast and accurate mapping of the spectral features during image construction, which is useful in spectral imaging of systems with ultra-fast dynamics, such as combustion flames and cold plasma in ion traps.

4.3 Spatial-Spectral Coherent Holographic Integrating Processor

A Spatial-Spectral Coherent Holographic Integrating Processor (S2CHIP) provides a technique for signal processing in optical domain (Merkel). In most applications, a chirped laser field is used for readout, processing, or both. The low latency and material memory time benefit from a fast chirp rate, κ. Embodiments of the present invention can be used to remove the distortions due to the fast chirp rate. The applications of S2CHIP include, but are not limited to, radar delay and Doppler signal processing, radio frequency (RF) signal processing and spectral analysis, Lidar signal processing, optical correlator, and true time delay processing.

Chang I pointed out that the fast chirp can be used for probing a single spatial-spectral grating. However, during probing of multiple spatial-spectral gratings or any other spectral features, the embodiments of the present invention are useful to remove distortions.

4.4 Spectrum Analyzer

One application of the inhomogeneously broadened absorptive material is spectral analysis. A chirped laser field is used with heterodyne detection to alleviate the requirement for a large detector bandwidth with large signal to noise ratio.

Materials containing inhomogeneously broadened absorbing centers with narrow homogeneous line width are used to implement broadband RF spectrum analyzer of high resolution, low latency, and high dynamic range. Two recording and readout schemes involve linear frequency chirped optical fields. The spectrum recovery technique of the invention applies to both schemes to ensure accurate mapping of the RF spectrum.

Scheme 1: As shown in FIG. 1, an RF signal with the spectrum to be measured is the input signal source 114 and modulated on an optical carrier from input laser 112 using EOPM 116 to produce the optical field 115 which has the target optical spectrum. The target optical spectrum is recorded as the absorption spectrum of the optical material 106. The absorption of the material 106 is modified according the power spectrum of the target optical spectrum. The absorption spectrum is read out by a linear chirped laser field 125$a$, produced by modulating an optical carrier from readout laser 122 in EOPM 124 driven by AWG 129. This arrangement is described in more detail in R. K. Mohan, Z. Cole, R. Reibel, T. Chang, K. D. Merkel, W. M. Babbitt, M. Colic, F. Schlottau, and K. H. Wagner, "Microwave Spectral Analysis Using Optical Spectral Holeburning", Technical Digest, 2004 IEEE Topical Meeting on Microwave Photonics, MWP 04, 24-27, 2004 the entire contents of which are hereby incorporated by reference as if fully set forth herein. The response signal 126 is the convolution of the chirped laser field 125$a$ and the target optical spectrum in material 106, as given by Expression 7b. Applying the spectrum recovery procedure described in FIG. 2 ensures the accurate measurement of the spectral features on the absorption profile, and hence, the RF spectrum of the data.

Scheme 2: Some embodiments of this invention also make possible another spectral analysis scheme using spectral hole burning in a novel manner. In this new technique, chirped gratings are prepared in the material and an optical field with the target optical spectrum is diffracted by the grating. Thus one or more chirped laser fields 125 are first burned in optical material 106 to form chirp gratings, and an optical field 115 with the target optical spectrum is later directed onto the chirped gratings to produce response signal 126.

Scheme 2 involves preparing a chirped spectral grating or chirped spatial grating. The preparation can be achieved by using two chirped fields with different chirp rates, or one chirp and one broadband brief pulse. For the various embodiments using two chirps, the two chirps are temporally overlapped or separated; the chirp rates are different and are opposite (e.g., one is an upward chirp and the other is a downward chirp). For wideband processing, the fast chirp rate is used since the material has limited coherence memory time. The created chirped spectral grating has a spacing varying linearly with the frequency. The chirp rate of the chirped spectral grating $\kappa g$ is defined such that the diffraction of a brief pulse by this grating is an optical chirp with that chirp rate $\kappa g$. With this definition, the chirp rate of a chirped grating is given by Expression 12a $$\kappa_g = 1 \bigg/ \left( \frac{1}{\kappa_2} - \frac{1}{\kappa_1} \right) \quad (12a)$$

where $\kappa_1$ and $\kappa_2$ are the chirp rates of two chirps, respectively. A brief pulse is assumed to have an infinite chirp rate.

Impinging on the optical material 106, an optical field with a target optical spectrum $E_d(t)$ is diffracted by the chirped spectral grating. A frequency chirped pulse or a reference chirp with proper chirp rate is use to heterodyne with the diffracted field. It is convenient to use a reference field 127 with the same chirp rate as the chirped grating. In this case the direct output signal measured by the detector 128 is similar to Expression 7b, $$|E^{out}(t)|^2 = (\eta E_0)^2 + A' \int_0^\infty E_d(\tau) \cos(2\pi \kappa_g t \tau + \phi_l + \phi_q + \phi) d\tau \quad (12b)$$

where A' is a constant related to the reference and impulse response amplitude and $\phi$ is a constant phase due to the chirped grating and the reference. In this processing, the direct readout experiences the same distortion represented by $\phi_q$ as in scheme 1. The same recovery procedure described in FIG. 2 is used to remove the extra phase terms $\phi_q$ and $\phi_l$. From the processed result, the target optical spectrum of the incident field $E_d(t)$ can be obtained.

The chirped heterodyne reference field 127 can be a delayed portion of the programming chirp field 125 by passing a beam through the material 106 or through the spatial region in the material 106 that is not affected by the programming pulses. Another way to generate the heterodyne chirped reference 127 in some embodiments is to add a broadband brief pulse to the optical field 115 so that the brief pulse is diffracted by the chirped grating into a linear frequency chirp of the same characteristic equivalent to a delayed programming chirp.

An angled beam geometry is also used in some embodiments to improve the performance, where the input optical field with the target optical spectrum and the output signal are spatially separated.

4.6 Other Optical Coherent Processors

A frequency chirped field in optical coherent transient and spectral hole burning processes causes a quadratic phase and distorts the output. In some applications, one or more chirped optical fields are employed in the processing. The quadratic phase may not be completely removed due to a chirp rate mismatch or other processing requirements. In some embodiments of the present invention, one or more steps of method 200 are used to remove the residual quadratic phase and the resulting distortion.

4.6 Multiple Chirp Readout

In some embodiments, two or more chirped optical fields are used for readout over multiple frequency bandwidths. If the chirps are in different directions, the resulting detected signals are detected on one or more detectors. For chirps that are overlapped in space, the resulting detected signals are received using the same detector. In various embodiments, the probing chirps are overlapped or separated in either frequency or time, or both. In various embodiments, the chirped optical fields are set to have the same or different durations. In various embodiments, the chirp rates are set to the same absolute value with the same or opposite sign. A common correction factor for removing the distortion due to the quadratic phase is determined by the absolute value of the chirp rate. The corrected signal is the sum of the individual corrected signals over the corresponding frequency range and in the corresponding chirp time.

5. Computational Hardware Overview

The data processing can be implemented in one or more computers, micro-processors, or similar devices that can implement Fourier transform or convolution, such as a field-programmable gate array (FPGA). The data processing can be performed with a program in any computer language or micro-processor language, or with any combination of hardware and software.

Figure 10:
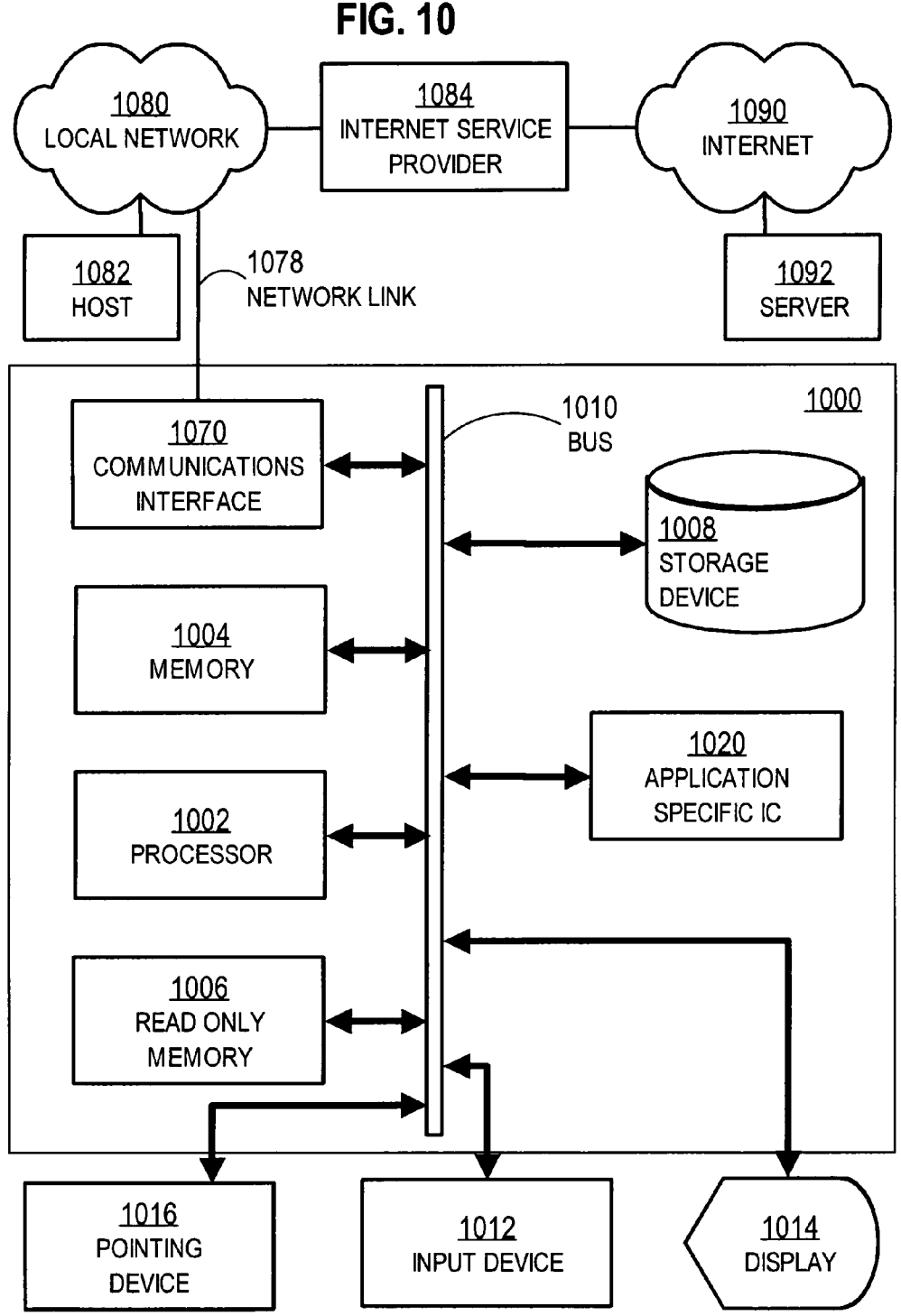
FIG. 10 is a block diagram that illustrates a computer system upon which an embodiment of the invention may be implemented.

FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitute computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as laser modulation control devices, signal triggering devices, robotic arms and medical scanning equipment that repeatedly perform some complex sequence of operations that are more efficiently implemented in hardware, field programmable gate array (FPGA) for performing application specific tasks, and analog to digital conversion for signal input.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 1078 typically provides information communication through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides information representing video data for presentation at display 1014.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1078 and other networks through communications interface 1070, which carry information to and from computer system 1000, are exemplary forms of carrier waves. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in storage device 1008 or other non-volatile storage for later execution, or both. In this manner, computer system 1000 may obtain application program code in the form of a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to an infra-red signal, a carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

6. Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for recovering optical spectral features using a chirped optical field, comprising the steps of:
   receiving a detected time series that represents a temporally varying intensity of an optical signal in response to an interaction between a target optical spectrum and a chirped optical field, wherein
      the chirped optical field is an optical field that has a monochromatic frequency that varies in time, and
      the target optical spectrum in an optical frequency dependent optical property of a material or device;
   determining a phase correction factor based only on one or more properties of the chirped optical field; and
   correcting the detected time series based on the phase correction factor to produce an output time series that reproduces in time a shape of the target spectrum in frequency.

2. A method as recited in claim 1, said step of determining the phase correction factor further comprising determining the phase correction factor based on a quadratic phase term.

3. A method as recited in claim 1, wherein:
   the chirped optical field has a plurality of well-known values for a corresponding plurality of well-known properties; and
   said step of determining the phase correction factor further comprising determining the phase correction factor based on the well-known values.

4. A method as recited in claim 3, wherein the plurality of well-known properties include:
   a constant chirp rate ($\kappa$) that indicates a change in frequency of the chirped optical field with time, and
   a start frequency ($\nu s$) that indicates an initial frequency at a start of the chirped optical field.

5. A method as recited in claim 4, said step of determining the phase correction factor further comprising determining a frequency ($\nu$) dependent correction factor based on a chirped phase term $\phi c$ given by the equation
   ti $\phi c = exp[i\pi(2\nu s\nu - \nu^2)/\kappa]$
   that includes an effect of a quadratic phase, where i is the square root of −1 and $\pi$ is the well known ratio of a circumference to a diameter.

6. A method as recited in claim 5, said step of correcting the detected time series based on the phase correction factor further comprising:
   determining a Fourier transform of the detected time series;
   multiplying the Fourier transform of the detected time series by the correction factor equal to the reciprocal of the phase term $\phi c$ to produce a corrected transform; and
   determining an inverse Fourier transform of the corrected transform to produce the output time series.

7. A method as recited in claim 5, said step of correcting the detected time series based on the phase correction factor further comprising:
   determining an inverse Fourier transform of the correction factor equal to the reciprocal of the phase term $\phi c$ to produce a transformed correction; and
   convolving the transformed correction with the detected time series to produce the output time series.

8. A method as recited in claim 1, said step of determining the phase correction factor further comprising determining a Fourier transform of the chirped optical field.

9. A method as recited in claim 8, said step of correcting the detected time series based on the phase correction factor further comprising:
   determining a Fourier transform of the detected time series;
   multiplying the Fourier transform of the detected time series by the correction factor proportional to the reciprocal of the Fourier transform of the chirped optical field to produce a corrected transform; and determining an inverse Fourier transform of the corrected transform to produce the output time series.

10. A method as recited in claim 1, said step of receiving a detected time series further comprising receiving a detected time series that represents a temporally varying intensity of an optical signal in response to an interaction between a chirped reference optical field and a response signal, wherein:
the response signal is due to the interaction of the target optical spectrum and the chirped optical field, and
the chirped reference optical field is selected to produce a detectable heterodyne signal at an optical detector.

11. A method for recovering optical spectral features using a chirped optical grating, comprising the steps of:
receiving a detected time series that represents a temporally varying intensity of an optical signal in response to an interaction between an incident optical field having a target optical spectrum and a material with a chirped spectral grating, wherein the chirped spectral grating is a spectral grating of grating period that varies with optical frequency, and
determining a phase correction factor based only on one or more properties of the chirped spectral grating; and
correcting the detected time series based on the phase correction factor to produce an output time series that reproduces in time a shape of the target spectrum in frequency.

12. A computer-readable medium carrying one or more sequences of instructions for recovering spectral features using a chirped optical field, wherein execution of the one or more sequences of instructions by one or more processors causes the one or more processors to perform the steps of:
receiving a detected time series that represents a temporally varying intensity of an optical signal in response to an interaction between a target optical spectrum and a chirped optical field, wherein
the chirped optical field is an optical field that has a monochromatic frequency that varies in time, and
the target optical spectrum is an optical frequency dependent optical property of a material or device;
determining a phase correction factor based only on one or more properties of the chirped optical field; and
correcting the detected time series based on the phase correction factor to produce an output time series that reproduces in time a shape of the target spectrum in frequency.

13. A computer-readable medium as recited in claim 12, said step of determining the phase correction factor further comprising determining the phase correction factor based on a quadratic phase term.

14. A computer-readable medium as recited in claim 12, wherein:
the chirped optical field has a plurality of well-known values for a corresponding plurality of well-known properties; and
said step of determining the phase correction factor further comprising determining the phase correction factor based on the well-known values.

15. A computer-readable medium as recited in claim 14, wherein the plurality of well-known properties include:
a constant chirp rate ($\kappa$) that indicates a change in frequency of the chirped optical field with time, and
a start frequency ($\nu s$) that indicates an initial frequency at a start of the chirped optical field.

16. A computer-readable medium as recited in claim 15, said step of determining the phase correction factor further comprising determining a frequency ($\nu$) dependent correction factor based on a chirped phase term $\phi c$ given by the equation ti $\phi c = exp[i\pi(2\nu s\nu - \nu^2)/\kappa]$ that includes an effect of a quadratic phase, where i is the square root of −1 and $\pi$ is the well known ratio of a circumference to a diameter.

17. A computer-readable medium as recited in claim 16, said step of correcting the detected time series based on the phase correction factor further comprising:
determining a Fourier transform of the detected time series;
multiplying the Fourier transform of the detected time series by the correction factor equal to the reciprocal of the phase term $\phi c$ to produce a corrected transform; and
determining an inverse Fourier transform of the corrected transform to produce the output time series.

18. A computer-readable medium as recited in claim 16, said step of correcting the detected time series based on the phase correction factor further comprising:
determining an inverse Fourier transform of the correction factor equal to the reciprocal of the phase term $\phi c$ to produce a transformed correction; and
convolving the transformed correction with the detected time series to produce the output time series.

19. A computer-readable medium as recited in claim 18, said step of correcting the detected time series based on the phase correction factor further comprising:
determining a Fourier transform of the detected time series;
multiplying the Fourier transform of the detected time series by the correction factor proportional to the reciprocal of the Fourier transform of the chirped optical field to produce a corrected transform; and
determining an inverse Fourier transform of the corrected transform to produce the output time series.

20. A computer-readable medium as recited in claim 12, said step of determining the phase correction factor further comprising determining a Fourier transform of the chirped optical field.

21. A computer-readable medium carrying one or more sequences of instructions for recovering spectral features using a chirped optical field, wherein execution of the one or more sequences of instructions by one or more processors causes the one or more processors to perform the steps of:
receiving a detected time series that represents a temporally varying intensity of an optical signal in response to an interaction between an incident optical field having a target optical spectrum and a material with a chirped spectral grating, wherein the chirped spectral grating is a spectral grating of grating period that varies with optical frequency, and
determining a phase correction factor based only on one or more properties of the chirped spectral grating; and
correcting the detected time series based on the phase correction factor to produce an output time series that reproduces in time a shape of the target spectrum in frequency.

* * * * *